United States Patent
Wen et al.

(10) Patent No.: US 9,428,693 B2
(45) Date of Patent: Aug. 30, 2016

(54) LIQUID CRYSTAL COMPOSITION HAVING NEGATIVE DIELECTRIC ANISOTROPY

(71) Applicant: Shijiazhuang Chengzhi Yonghua Display Materials Co., Ltd., Hebei Province (CN)

(72) Inventors: Gang Wen, Hebei Province (CN); Ruimao Hua, Hebei Province (CN); Guoliang Yuan, Hebei Province (CN); Jingyi Feng, Hebei Province (CN); Lianbo Mao, Hebei Province (CN); Xiaobin Rong, Hebei Province (CN); Lihong Gui, Hebei Province (CN); Ziqian Shi, Hebei Province (CN)

(73) Assignee: Shijiazhuang Chengzhi Yonghua Display Materials Co., Ltd., Shi Jia Zhuang (CN)

( * ) Notice: Subject to any disclaimer, the term of this patent is extended or adjusted under 35 U.S.C. 154(b) by 0 days.

(21) Appl. No.: 14/407,753

(22) PCT Filed: Aug. 23, 2013

(86) PCT No.: PCT/CN2013/001003
§ 371 (c)(1),
(2) Date: Dec. 12, 2014

(87) PCT Pub. No.: WO2014/094346
PCT Pub. Date: Jun. 26, 2014

(65) Prior Publication Data
US 2015/0184075 A1     Jul. 2, 2015

(30) Foreign Application Priority Data
Dec. 20, 2012  (CN) .......................... 2012 1 0558301

(51) Int. Cl.
| | |
|---|---|
| *C09K 19/44* | (2006.01) |
| *C09K 19/30* | (2006.01) |
| *G02F 1/00* | (2006.01) |
| *C09K 19/04* | (2006.01) |

(52) U.S. Cl.
CPC ........... *C09K 19/3066* (2013.01); *C09K 19/30* (2013.01); *C09K 19/3003* (2013.01); *C09K 19/3028* (2013.01); *C09K 19/44* (2013.01); *G02F 1/0045* (2013.01); *C09K 2019/0448* (2013.01); *C09K 2019/301* (2013.01); *C09K 2019/3004* (2013.01); *C09K 2019/3009* (2013.01); *C09K 2019/3016* (2013.01); *C09K 2019/3096* (2013.01)

(58) Field of Classification Search
CPC ............................................. C09K 2019/3009
See application file for complete search history.

(56) References Cited

U.S. PATENT DOCUMENTS

| | | | |
|---|---|---|---|
| 2008/0206490 A1* | 8/2008 | Reiffenrath ............ | C09K 19/30 425/1.1 |
| 2015/0152330 A1* | 6/2015 | Yun ...................... | C07C 43/225 252/299.63 |

FOREIGN PATENT DOCUMENTS

| | | |
|---|---|---|
| CN | 101544893 | 9/2009 |
| CN | 103074073 | 5/2013 |
| CN | 102575166 | 7/2015 |

OTHER PUBLICATIONS

International Search Report dated Nov. 1, 2012; International Application No. PCT/CN2013/001003; International Filing Date: Aug. 23, 2013; 4 pages.
English translation of International Search Report dated Nov. 1, 2012; International Appl'n. No. PCT/CN2013/001003; International Filing Date: Aug. 23, 2013; 3 pages.
English abstract; Chinese Application No. CN101544893 published Sep. 30, 2009; 1 page.
English abstract; Chinese Application No. CN102575166 published Jul. 11, 2012; 1 page.
English abstract; Chinese Application No. CN103074073 published May 1, 2013; 1 page.

* cited by examiner

*Primary Examiner* — Chanceity Robinson
(74) *Attorney, Agent, or Firm* — Blank Rome LLP

(57) ABSTRACT

A liquid crystal composition having a negative dielectric anisotropy is disclosed. The liquid crystal composition includes compounds of Formulas I to IV. The composition has a low threshold voltage, a low rotary viscosity, a high resistivity, a high voltage holding ratio, and a good high temperature and UV stability. The LC medium has the advantage of obviously reduced response time after polymerization under UV irradiation, thus having important application value.

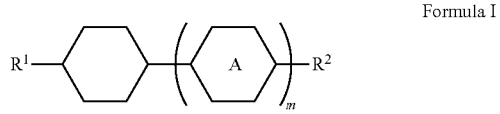

Formula I

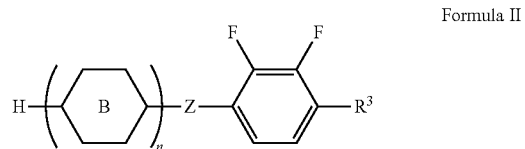

Formula II

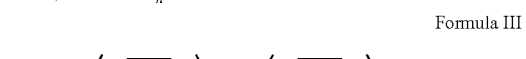

Formula III

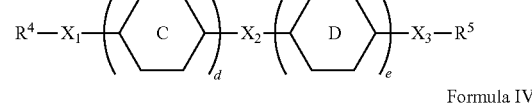

Formula IV

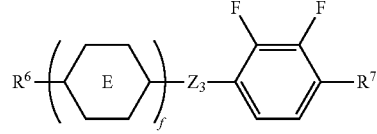

19 Claims, No Drawings

LIQUID CRYSTAL COMPOSITION HAVING NEGATIVE DIELECTRIC ANISOTROPY

FIELD OF THE INVENTION

The present invention relates to a liquid crystal composition having a negative dielectric anisotropy.

BACKGROUND OF THE INVENTION

Due to light and thin, power saving, and low irradiation features, liquid crystal display panels have gradually replaced conventional cathode-ray tube display devices and are widely used in commercial and consumer electronic products. Based on the driving modes, the liquid crystal display panels may be divided into passive matrix (PM) and active matrix (AM) liquid crystal displays. The PM liquid crystal display includes static and multiplex liquid crystal displays etc, and the AM liquid crystal display mainly includes thin film transistor (TFT) liquid crystal displays at present. For AM liquid crystal display devices, TN (twisted nematic) type has once been popular, but it has the disadvantage of narrow viewing angle. In view of this, MVA (multi-domain vertical alignment) and IPS (in-plane switching) type liquid crystal technologies are now employed in liquid crystal panels with a wide viewing angle.

IPS wide viewing angle technology was developed by Hitachi in 1995. In the technology, a voltage is applied to the electrodes in an IPS mode, so that the liquid crystal molecules originally parallel to the electrodes rotate to an orientation perpendicular to the electrodes, with the major axis of the liquid crystal being still parallel to the substrate. The liquid crystal molecules may be rotated to a desired angle only by controlling the voltage, which may be used in combination with a polarizer to modulate the transmittance of the polarized light, so as to display various color scales. The liquid crystal molecules in IPS mode has a working principle similar to that of the liquid crystal molecules in TN mode, except that the liquid crystal molecules in IPS mode are aligned in a non twist nematic mode, with the major axis being always parallel to the substrate. However, the electrodes should be fabricated into comb-like and aligned on the surface of an underlying layer. This may result in a reduced contrast. Because of the fact that positioning the electrodes on the same plane may lower the aperture ratio and decrease the light transmittance, the brightness of a backlight source must be enhanced. Compared with the conventional TFT-TN type liquid crystal display, the contrast and response time of the IPS type liquid crystal display are not improved.

MVA is a multi-domain vertical alignment technology, which makes use of projections to enable the liquid crystal when in static to deflect to a certain angle, instead of being in conventional vertical pattern. When a voltage is applied to make the liquid crystal molecules horizontal, the backlight can penetrate more quickly, such that the response time can be reduced greatly. Furthermore, the viewing angle is widened because the orientation of the liquid crystal molecules is altered by the projections. The viewing angle can be increased up to above 160 degrees, and the response time is reduced to less than 20 ms.

In an MVA type liquid crystal display device, for the purpose of widening the viewing angle, the liquid crystal molecules are inclined to 4 directions by the applied voltage. Due to the complex protrusion and ITO slit configurations, the light transmittance becomes low. In case that the configurations are simplified, and the interval between the protrusions or the gap of the ITO slits is increased, the light transmittance can be increased. However, if the interval between the protrusions or the gap of the ITO slits is too large, the propagation of the inclination of the liquid crystal molecules becomes much slow, and thus the response becomes very slow.

SUMMARY OF THE INVENTION

An objective of the present invention is to provide a liquid crystal composition having a negative dielectric anisotropy.

DETAILED DESCRIPTION OF THE INVENTION

The liquid crystal composition provided in the present invention comprises the compounds of Formulas I to IV:

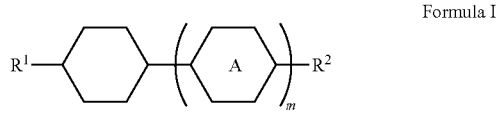

Formula I

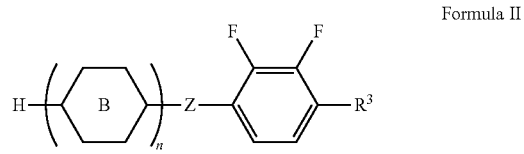

Formula II

Formula III

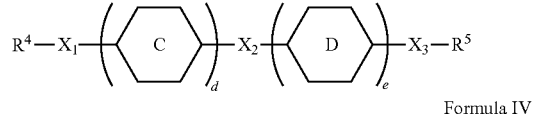

Formula IV

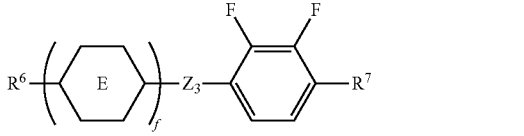

where in Formula I, $R^1$ and $R^2$ are each selected from a group a or b below, in which:
a is selected from at least one of C1-C12 alkyl, C1-C12 alkyl substituted with fluoro or chloro, C1-C12 alkoxy, C1-C12 alkoxy substituted with fluoro or chloro, H and —CH=CH$_2$; specifically, the alkyl in C1-C12 alkyl or substituted C1-C12 alkyl is C1-C11 alkyl, C1-C10 alkyl, C1-C9 alkyl, C1-C8 alkyl, C2-C12 alkyl, C1-C10 alkyl, C1-C5 alkyl or C1-C4 alkyl, and the alkoxy in C1-C12 alkoxy or substituted C1-C12 alkoxy is C1-C11 alkoxy, C1-C10 alkoxy, C1-C9 alkoxy, C1-C8 alkoxy, C2-C12 alkoxy, C1-C10 alkoxy, C1-C5 alkoxy, or C1-C4 alkoxy; and
b is a group formed by substituting at least one —CH$_2$— in the group a with at least one of the groups below: —CH=CH— and —O—;

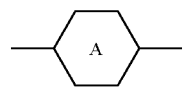

is selected from at least one of 1,4-phenylene, 1,4-phenylene monosubstituted with fluoro or chloro, 1,4-cyclohexyl, and a group formed by substituting one or two —CH$_2$— in 1,4-cyclohexyl with O; and
m is 1 or 2.

In Formula II, H is cyclopentyl or cyclobutyl:

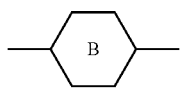

is as defined for

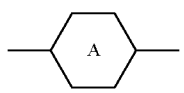

in Formula I;
Z is selected from at least one of a single bond, —COO—, —CH$_2$O— and —CH$_2$CH$_2$—;
R$^3$ is selected from at least one of C1-C6 alkyl or C1-C6 alkoxy; specifically C1-C5 alkyl, C1-C4 alkyl, C1-C3 alkyl, C1-C2 alkyl, C2-C5 alkyl, C2-C4 alkyl, C2-C3 alkyl, C3-C5 alkyl, C3-C4 alkyl, C4-C5 alkyl, C1-C5 alkoxy, C1-C4 alkoxy, C1-C3 alkoxy, C1-C2 alkoxy, C2-C5 alkoxy, C2-C4 alkoxy, C2-C3 alkoxy, C3-C5 alkoxy, C3-C4 alkoxy or C4-C5 alkoxy, and more specifically —OC$_2$H$_5$, —OC$_4$H$_9$, —CH$_3$, —C$_2$H$_5$, —C$_4$H$_9$, —OC$_3$H$_7$, —C$_3$H$_7$ or —OCH$_3$; and
n is 1 or 2

In Formula III, R$^4$ and R$^5$ are each selected from at least one of C2-C12 alkenyl or C2-C12 alkenyl substituted with halo, acrylate, methacrylate, ethenyloxy, propenyloxy, oxiranyl, oxetanyl and ketenyl, and at least one of the R$^4$ and R$^5$ is acrylate, methacrylate, ethenyloxy, propenyloxy, oxiranyl, oxetanyl or ketenyl; specifically, the alkenyl in C1-C12 alkenyl or substituted C1-C12 alkenyl is C1-C11 alkenyl, C1-C10 alkenyl, C1-C9 alkenyl, C1-C8 alkenyl, C2-C12 alkenyl, C1-C10 alkenyl, C1-C5 alkenyl or C1-C4 alkenyl;

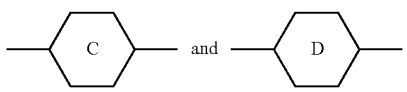

are each selected from a group g or h below, in which:
g is selected from at least one of 1,4-phenylene, 1,4-phenylene substituted with fluoro, 1,4-cyclohexyl, a group formed by substituting one or two —CH$_2$— in 1,4-cyclohexyl with O or S, 3,7-dibenzofuranyl, 1,4-bicyclo[2,2,2]octylene, piperidin-1,4-diyl, naphthalen-2,6-diyl, decahydronaphthalen-2,6-diyl, 1,2,3,4-tetrahydronaphthalen-2,6-diyl and indan-2,5-diyl; and
h is a group formed by substituting at least one hydrogen in the group g with at least one of the groups below: F, Cl, C1-C7 alkyl, C1-C7 alkoxy, C1-C7 alkylcarbonyl, C1-C7 alkoxycarbonyl and C1-C7 alkylcarbonyloxy; specifically, the C1-C7 alkyl is C2-C7 alkyl, C1-C6 alkyl, C1-C5 alkyl, C1-C4 alkyl. C3-C7 alkyl, C2-C6 alkyl or C2-C5 alkyl; the C1-C7 alkoxy is C2-C7 alkoxy, C1-C6 alkoxy, C1-C5 alkoxy, C1-C4 alkoxy, C4-C7 alkoxy, C3-C7 alkoxy, C2-C6 alkoxy or C2-C5 alkoxy; the C1-C7 alkylcarbonyl is C2-C7 alkylcarbonyl, C1-C6 alkylcarbonyl, C1-C5 alkylcarbonyl, C1-C4 alkylcarbonyl, C4-C7 alkylcarbonyl, C3-C7 alkylcarbonyl, C2-C6 alkylcarbonyl or C2-C5 alkylcarbonyl; and the C1-C7 alkoxycarbonyl is C2-C7 alkoxycarbonyl, C1-C6 alkoxycarbonyl, C1-C5 alkoxycarbonyl, C1-C4 alkoxycarbonyl, C4-C7 alkoxycarbonyl, C3-C7 alkoxycarbonyl. C2-C6 alkoxycarbonyl or C2-C5 alkoxycarbonyl:
X$_1$ and X$_3$ are each selected from at least one of —O—, —S—, —OCH$_2$—, —CH$_2$O—, —CO—, —COO—, —OCO—, —OCO—O—, —CH$_2$CH$_2$—, a single bond, C1-C12 alkylene, a group formed by substituting at least one —CH$_2$— in C1-C12 alkylene with —O—, and C2-C12 alkylene substituted with halo; specifically, the alkylene in C1-C12 alkylene or substituted C1-C12 alkylene is C1-C11 alkylene, C1-C10 alkylene, C1-C9 alkylene, C1-C8 alkylene, C2-C12 alkylene, C1-C10 alkylene, C1-C5 alkylene, or C1-C4 alkylene;
X$_2$ is a single bond, —OCH$_2$—, —CH$_2$O—, —CO—, —COO—, —OCO—, —OCO—O— or —CH$_2$CH$_2$—; and
d and e are each an integer of 0-3.

In Formula IV, R$^6$ and R$^7$ are each a group j or k, in which:
j is selected from at least one of C1-C8 alkyl, C1-C8 alkyl substituted with fluoro or chloro, C1-C8 alkoxy, C1-C8 alkoxy substituted with fluoro or chloro, H, —CH═CH$_2$ and —CH═CH—CH$_3$; specifically, the alkyl in C1-C8 alkyl or substituted C1-C8 alkyl is C1-C7 alkyl, C1-C6 alkyl, C1-C5 alkyl, C1-C4 alkyl, C2-C8 alkyl, C2-C7 alkyl, C2-C6 alkyl or C2-C5 alkyl; the alkoxy in C1-C8 alkoxy or substituted C1-C8 alkoxy is C1-C7 alkoxy, C1-C6 alkoxy, C1-C5 alkoxy, C1-C4 alkoxy, C2-C8 alkoxy, C2-C7 alkoxy, C2-C6 alkoxy or C2-C5 alkoxy;
k is a group formed by substituting at least one —CH$_2$— in the group j with at least one of the groups below: —CH═CH—, —COO—, —OOC— or —O—;

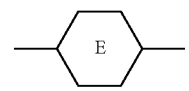

is selected from at least one of 1,4-phenylene, 1,4-phenylene substituted with fluoro, 1,4-cyclohexyl, and a group formed by substituting one or two —CH$_2$— in 1,4-cyclohexyl with O;
Z$_3$ is a single bond, —COO—, —CH$_2$O—, —CH$_2$CH$_2$— or —CH$_2$—; and
f is 2 or 3.

The liquid crystal composition provided in the present invention may only consist of the compounds of Formulas I to IV.

Specifically, the weight ratio of the compounds of Formulas I, II, III and IV is (5-60):(1-60):(0.1-5):(1-80), and preferably (10-50):(1-40):(0.1-2):(10-60), specifically (20-50):(10-30):(0.1-1):(20-50), and more specifically (31-40):(15-27):(0.1-1):(41-46), (32-39):(18-23):(0.1-1):(41-45), (32-39):(15-23):(0.1-1):(41-45), (37-39):(20-22):(0.1-1):(41-45), (31-40):(15-27):0.3:(41-46), (32-39):(18-23):0.3:(41-45), (32-39):(15-23):0.3:(41-45), or (37-39):(20-22):0.3:(41-45).

The compound of Formula III is any one of the compounds of Formulas III-1 to III-32:

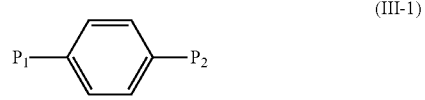

(III-1)

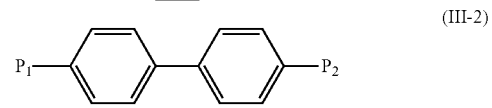

(III-2)

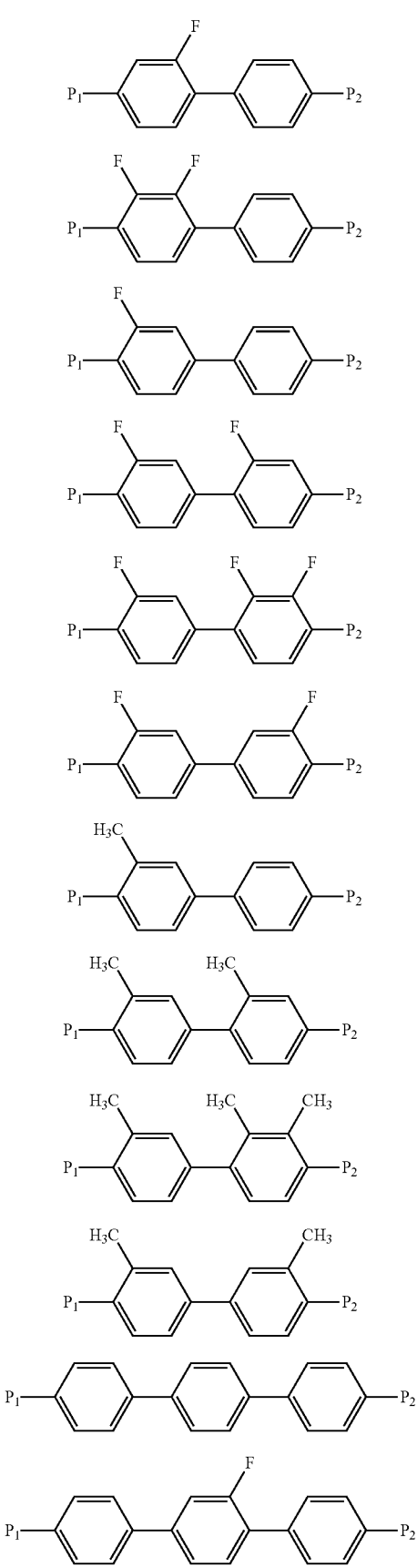
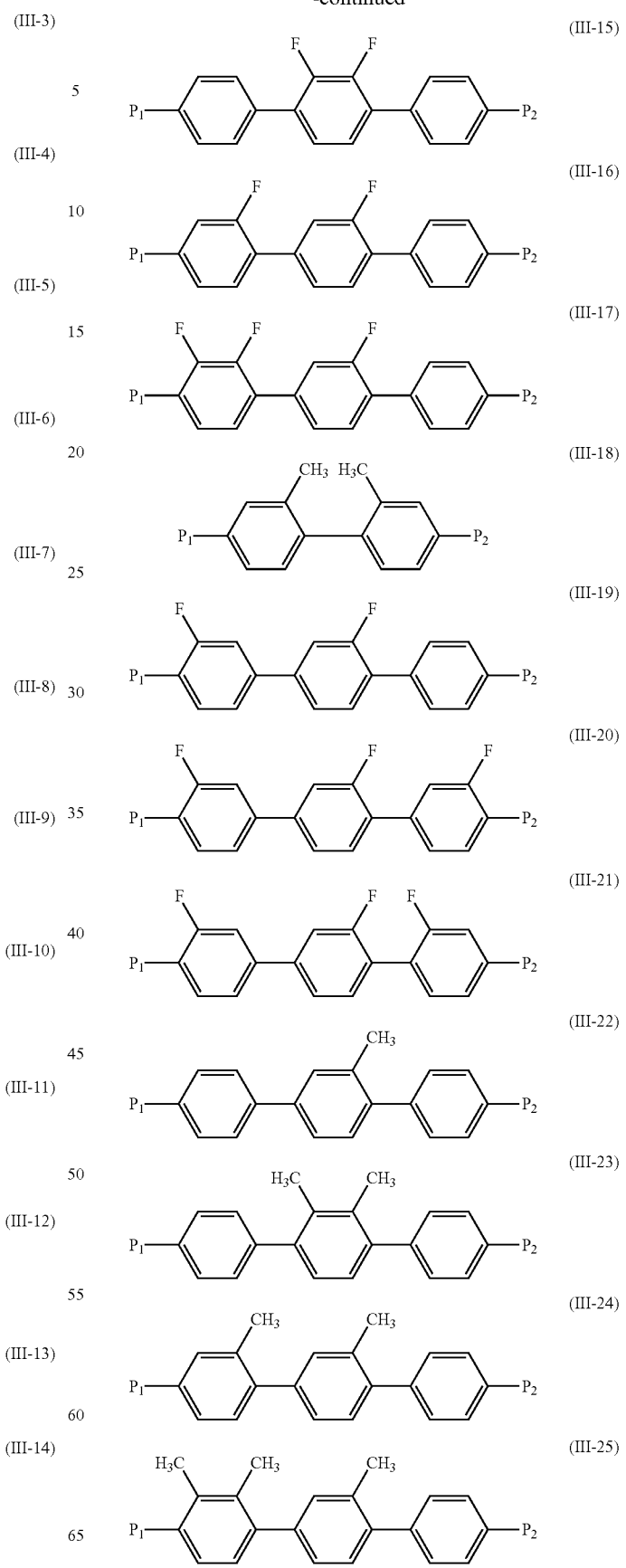

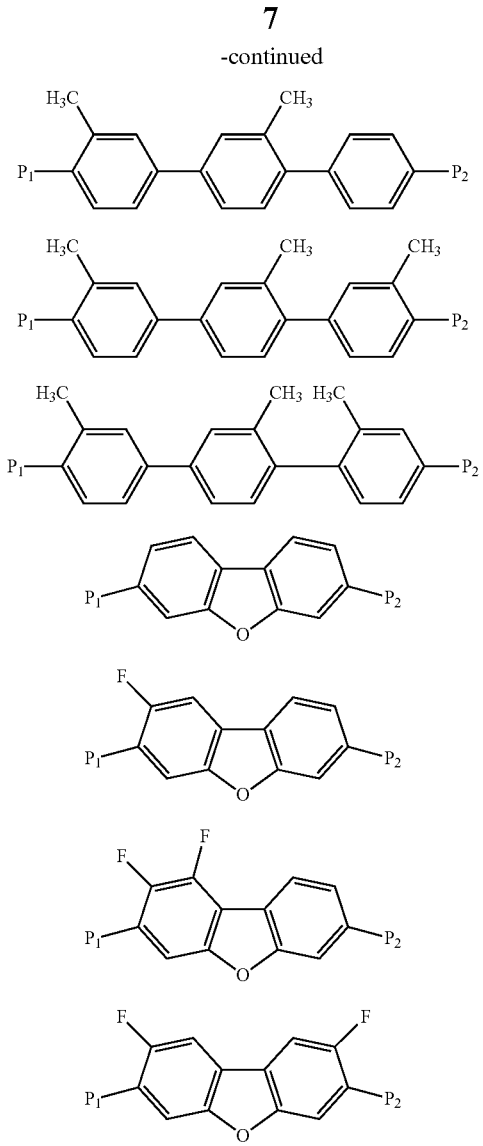

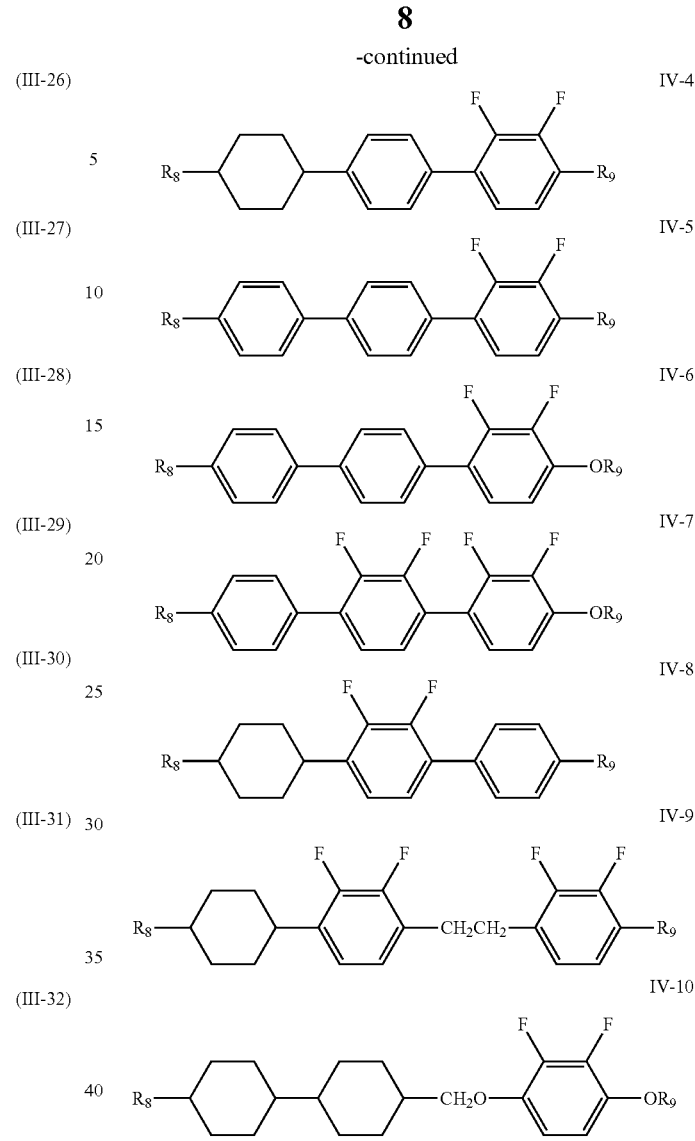

In the Formulas III-1 to III-32, $P_1$ and $P_2$ are as defined for $R^4$ and $R^5$.

The compound of Formula IV is selected from any one of the compounds of Formulas IV-1 to IV-10:

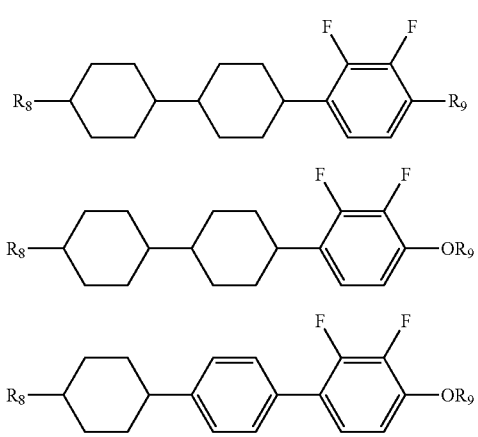

In Formulas IV-1 to IV-10, $R^8$ and $R^9$ are each selected from at least one of C1-C8 alkyl groups.

Specifically, the liquid crystal composition is consisted of 1 to 5 compounds of Formula I, 1 to 6 compounds of Formula II, 1 to 2 compounds of Formula III and 1 to 6 compounds of Formula IV.

Preferably, the liquid crystal composition is consisted of 1 to 4 compounds of Formula I, 1 to 5 compounds of Formula II, 1-2 compounds of Formula III and 1 to 5 compounds of Formula IV.

The composition may further comprise at least one of the components below: the compound of Formulas V and VI and an initiator.

Formula V

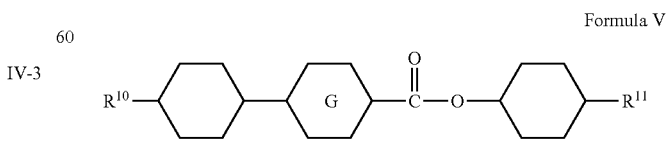

In Formula V, $R^{10}$ and $R^{11}$ are each selected from at least one of C1-C8 alkyl groups.

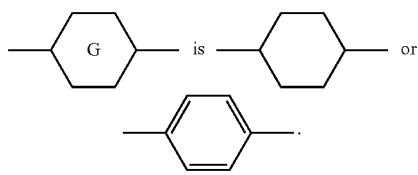

is 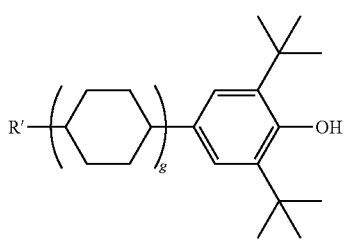

The compound of Formula V is present in an amount of 1-40% and preferably 1-20% based on the total weight of the composition.

Formula VI

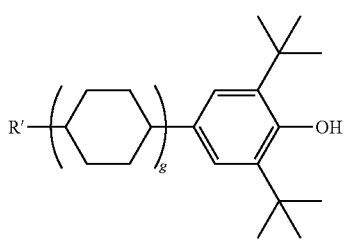

In Formula VI, R' is selected from at least one of C1-C8 alkyl or C1-C8 alkoxy; and g is an integer of 0-2.

The compound of Formula VI is present in an amount of 0.001-0.1%, preferably 0.01-0.05%, and specifically 0.02% based on the total weight of the composition.

The compound of Formula VI is an antioxidant, which acts to prevent the decrease in resistivity or voltage holding ratio due to the long-term use of the display element, especially at a high temperature.

The initiator is selected from at least one of Irgacure 651, Irgacure 184 and Darocure 1173, which may be commercially available from, for example, BASF of Germany, where the CAS Nos of Irgacure 651, Irgacure 184, and Darocure 1173 are respectively 24650-42-8, 947-19-3, and 7473-98-5.

The initiator is present in an amount of 0.001-0.05% and specifically 0.006% based on the total weight of the composition.

The initiator initiates the photopolymerization of the polymerizable compound of Formula III under UV irradiation.

The difference range between the maximum temperature and the minimum temperature over which the liquid crystal composition is maintained in a nematic phase is not less than 80 temperature units, and preferably not less than 100 temperature units.

The liquid crystal composition has a rotary viscosity not higher than 250 mPa·s, and preferably not higher than 200 mPa·s;
a dielectric anisotropy $\Delta\varepsilon$ at 25° C. and 1 kHz of −0.5 to −7.5, and preferably −2.0 to −5.5; and
a birefringence $\Delta n$ lower than 0.15, preferably 0.05-0.13, and particularly 0.08-0.11.

The present invention further provides a method for preparing the composition, comprising the step of uniformly mixing each of the components of the composition above to obtain the composition.

The liquid crystal composition is specifically a liquid crystal composition $P1M_1$, $P1M_2$, $P1M_3$, $P2M_1$, $P3M_1$, $P4M_1$, $P5M_1$, $P6M_1$, $P7M_1$ or $P10M_1$.

The liquid crystal composition $P1M_1$ is consisted of, in parts by weight, the compounds of Formula I to Formula IV below.

Compound of Formula I

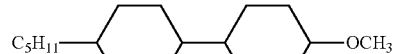
9

10

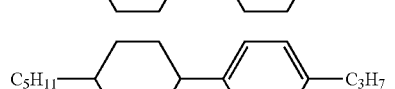
14

4

Compound of Formula II

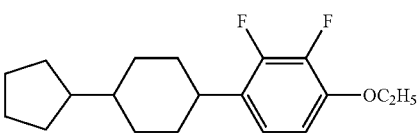
12

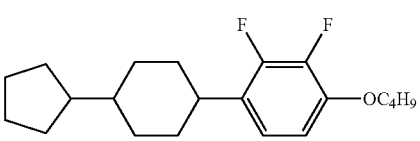
10

Compound of Formula IV

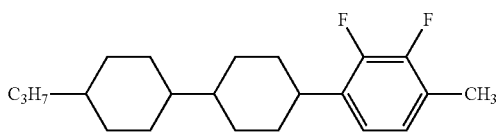
14

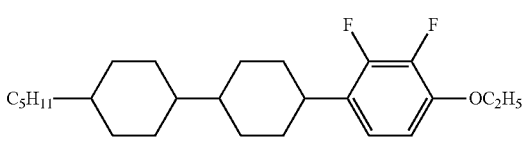
7

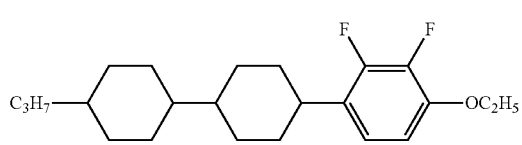
8

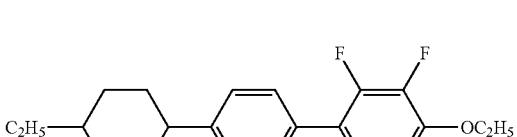
12

Compound $M_1$ of Formula III

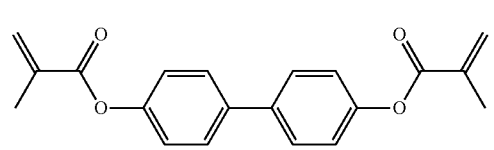
0.3

In the liquid crystal composition $P1M_2$: the compounds of Formula I, Formula II and Formula IV and the amounts in parts by weight thereof are the same as those in the liquid crystal composition P1M$_1$, and the compound of Formula III is replaced by equivalent parts by weight of M$_2$:

[Structure: dimethacrylate with fluorinated biphenyl] 0.3

In the liquid crystal composition P1M$_3$: the compounds of Formula I, Formula II and Formula IV and the amounts in parts by weight thereof are the same as those in liquid crystal composition P1M$_1$, and the compound of Formula III is replaced by equivalent parts by weight of M$_3$:

[Structure: diacrylate biphenyl] 0.3

The liquid crystal composition P2M$_1$ is consisted of, in parts by weight, the compounds of Formulas I to IV below.

Compound of Formula I

[Structure: C$_5$H$_{11}$–cyclohexyl–cyclohexyl–OCH$_3$] 9

[Structure: C$_5$H$_{11}$–cyclohexyl–cyclohexyl–C$_3$H$_7$] 20

[Structure: C$_2$H$_5$–cyclohexyl–cyclohexyl–phenyl–C$_3$H$_7$] 2

Compound of Formula II

[Structure: cyclopentyl–cyclohexyl–difluorophenyl–OC$_2$H$_5$] 10

[Structure: cyclopentyl–cyclohexyl–difluorophenyl–OC$_4$H$_9$] 6

[Structure: cyclobutyl–cyclohexyl–difluorophenyl–OC$_2$H$_5$] 7

Compound of Formula IV

[Structure: C$_3$H$_7$–cyclohexyl–cyclohexyl–difluorophenyl–CH$_3$] 12

[Structure: C$_5$H$_{11}$–cyclohexyl–cyclohexyl–difluorophenyl–OC$_2$H$_5$] 10

[Structure: C$_3$H$_7$–cyclohexyl–cyclohexyl–difluorophenyl–OC$_2$H$_5$] 9

[Structure: C$_2$H$_5$–cyclohexyl–phenyl–difluorophenyl–OC$_2$H$_5$] 12

[Structure: C$_3$H$_7$–cyclohexyl–difluorophenyl–C$_2$H$_4$–difluorophenyl–OC$_2$H$_5$] 3

Compound M$_1$ of Formula III

[Structure: dimethacrylate biphenyl] 0.3

The liquid crystal composition P3M$_1$ is consisted of, in parts by weight, the compounds of Formulas I to IV below.

Compound of Formula I

[Structure: C$_5$H$_{11}$–cyclohexyl–cyclohexyl–vinyl] 8

[Structure: C$_5$H$_{11}$–cyclohexyl–cyclohexyl–C$_3$H$_7$] 15

[Structure: C$_5$H$_{11}$–cyclohexyl–phenyl–C$_3$H$_7$] 10

[Structure: C$_2$H$_5$–cyclohexyl–cyclohexyl–phenyl–C$_3$H$_7$] 4

-continued

Compound of Formula II

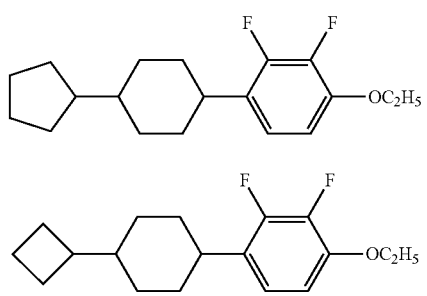

12

10

Compound of Formula IV

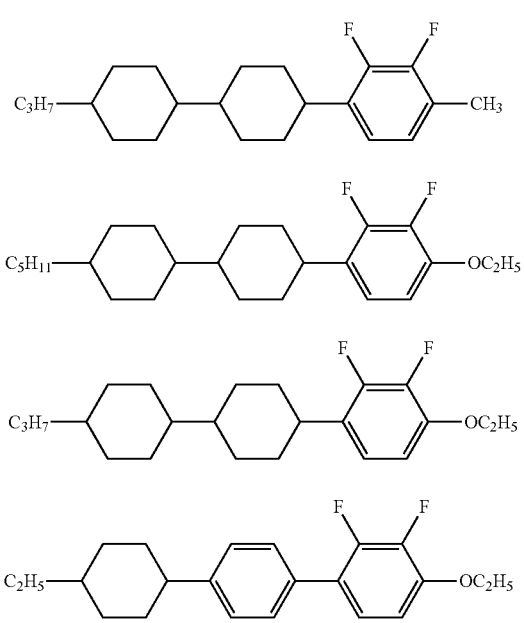

14

7

8

12

Compound M₁ of Formula III

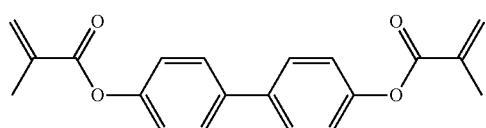

0.3

The liquid crystal composition P4M₁ is consisted of, in parts by weight, Formulas I to IV.

Compound of Formula I

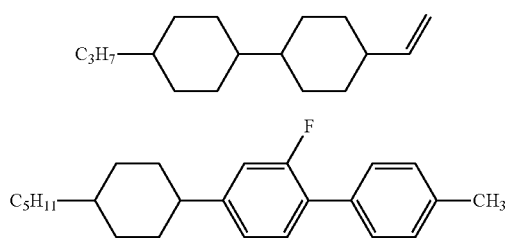

30

2

-continued

Compound of Formula II

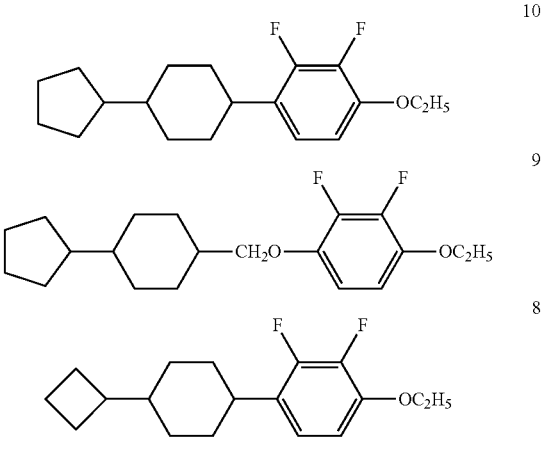

10

9

8

Compound of Formula IV

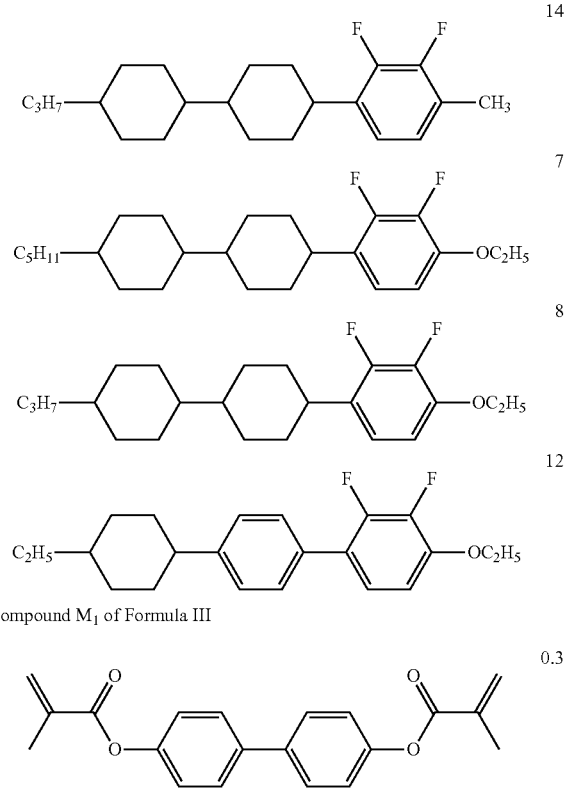

14

7

8

12

Compound M₁ of Formula III

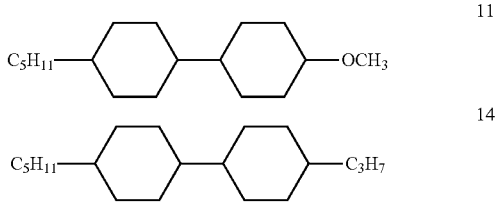

0.3

The liquid crystal composition P5M₁ is consisted of, in parts by weight, the compounds of Formulas I to IV below.

Compound of Formula I

11

14

-continued

Compound of Formula II
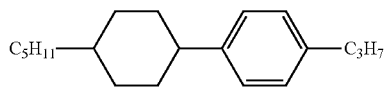
14

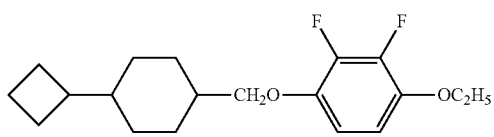
10

Compound of Formula IV
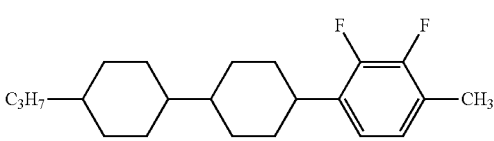
10

12

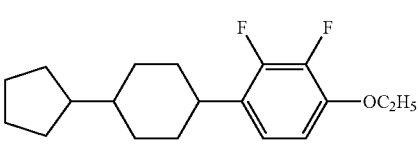
7

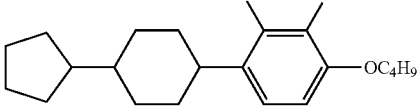
8

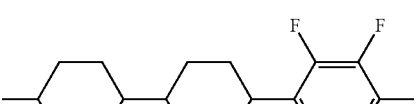
12

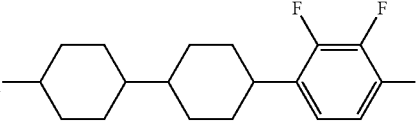
2

Compound $M_1$ of Formula III
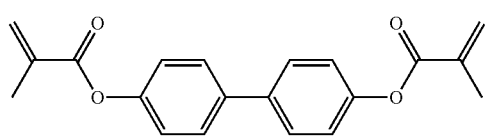
0.3

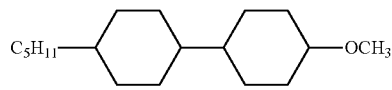

The liquid crystal composition $P6M_1$ is consisted of, in parts by weight, the compounds of Formula I to IV.

Compound of Formula I

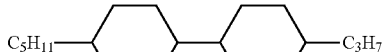
10

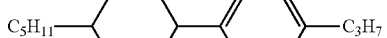
14

4

Compound of Formula II

10

8

Compound of Formula IV

14

7

8

4

Compound $M_1$ of Formula III

12

0.3

The liquid crystal composition $P7M_1$ is consisted of, in parts by weight, the compounds of formulas I to IV.

Compound of Formula I

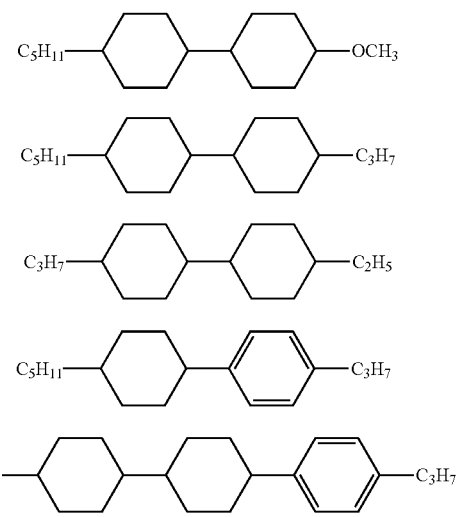

Compound of Formula II

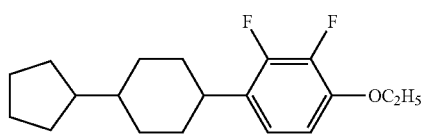

Compound of Formula IV

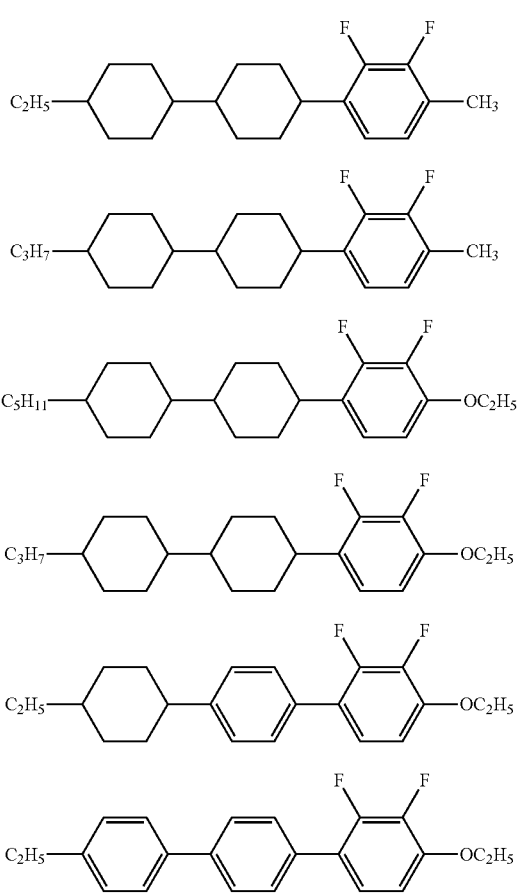

| | |
|---|---|
| 9 | 5 |
| 8 | |
| 10 | |
| 5 | |
| 14 | |
| 4 | |
| 15 | |
| 10 | |
| 10 | |
| 7 | |
| 8 | |
| 8 | |
| 2 | |

Compound $M_1$ of Formula III

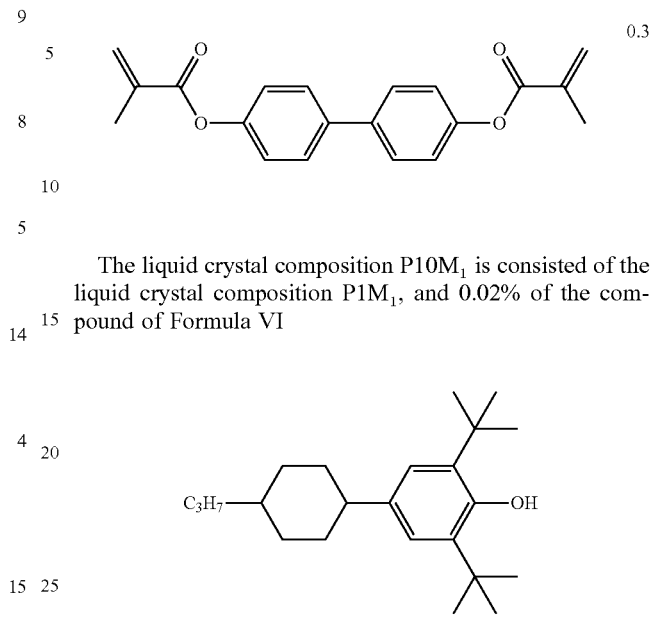

The liquid crystal composition $P10M_1$ is consisted of the liquid crystal composition $P1M_1$, and 0.02% of the compound of Formula VI

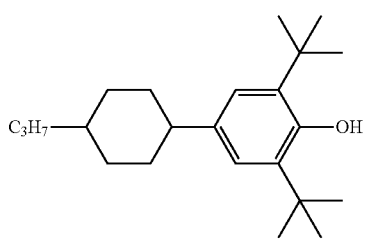

and 0.006% of the initiator Irgacure 651, based on the total weight of $P1M_1$.

Further, an electro-optical display with active matrix addressing having the composition as an electrolyte also falls within the protection scope of the present invention. The display is a display of in-plane switching (IPS), vertical alignment (VA), multi-domain vertical alignment (MVA), patterned vertical alignment (PVA) or polymer stabilized vertical alignment (PSVA), and other modes, and preferably a VA, MVA, PVA, PSVA, PSA-VA, PS-IPS or PSA-IPS type display.

EXAMPLES

The present invention is further elaborated in connection with specific examples below; however, the present invention is not limited thereto. Unless specifically indicated otherwise, the processes are all conventional. Unless specifically indicated otherwise, the raw materials are all commercially available.

In the present invention, the compound of Formula II is prepared as described in Synthesis Routes 1 to 5 below. In Synthesis Routes 1 to 3, the synthesis of some intermediates that are not commercially available is given, and the synthesis principles, operations, conventional post treatments, silica gel column chromatography, purification through recrystallization, and others are all known to persons of skill in the art. The target products can be absolutely obtained through the synthesis process described below.

The progression of the reaction process is generally monitored by TLC. The post treatments after reaction generally include water washing, extracting, combining the organic phases and then drying, evaporating off the solvent under reduced pressure, recrystallizing, and column chromatography. The present invention may be accomplished by those skilled in the art following the description below.

I. Synthesis Route 1:

A compound of Formula II is prepared, where ring B is 1,4-cyclohexyl, Z is a single bond, and n is 1 or 2.

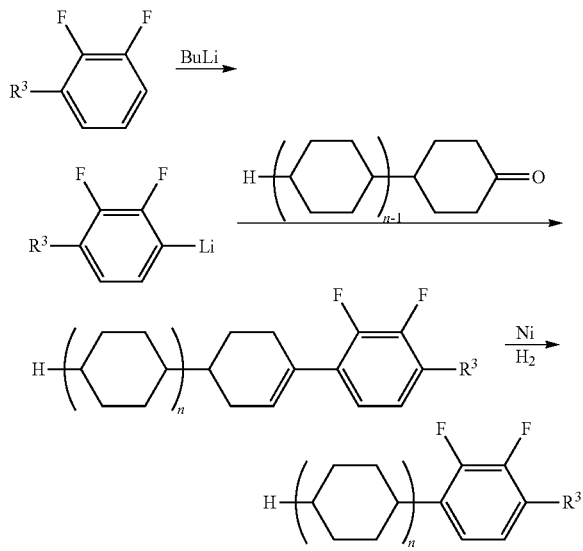

1) n-butyl lithium is added to a solution of

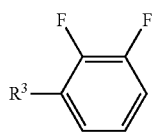

in the solvent tetrahydrofuran at −70° C. under an inert atmosphere, to perform substitution of

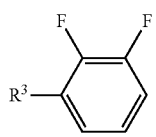

with lithium. After 15 min,

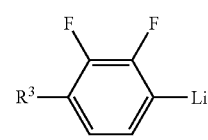

is obtained. Then

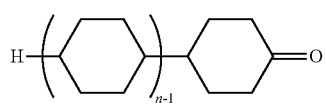

is added, to perform the addition of the lithium reagent onto the ketone. After addition, the solution is heated to −30° C., and then poured into 100 ml water. Ater phase separation, the organic phase is separated, washed 2 times with water, and directly evaporated to remove the solvent completely. The residue is added with p-toluene sulfonic acid and toluene, and water is removed under reflux until no water is separated out after 1 hr. Then, it is purified by silica gel column chromatography and after rinsing with petroleum ether and evaporation off of the solvent,

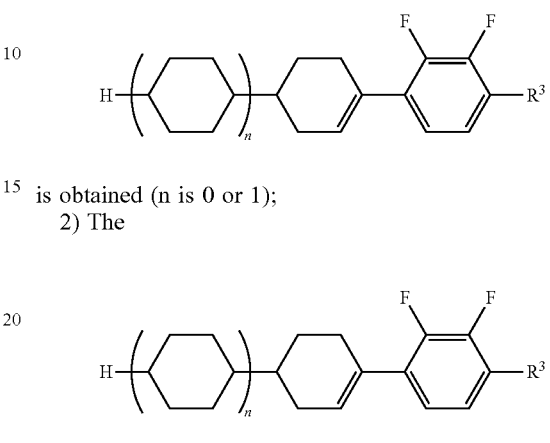

is obtained (n is 0 or 1);

2) The

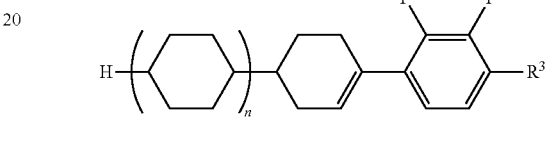

obtained in Step 1) is dissolved in toluene and ethanol, and hydrogenated at normal temperature under normal pressure for 10 hrs in the presence of the catalyst Raney nickel, to obtain a compound of Formula I, in which ring B is 1,4-cyclohexyl, Z is a single bond, and n is 1 or 2.

The intermediates

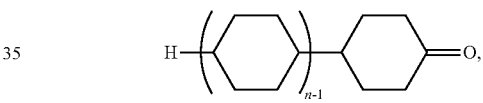

that is,

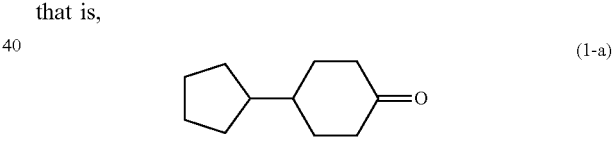

(1-a)

(correspondingly, H is cyclopentyl, and n is 1),

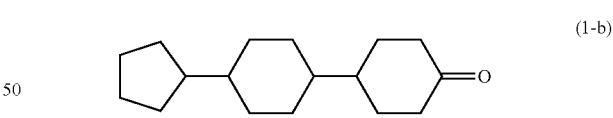

(1-b)

(correspondingly, H is cyclopentyl, and n is 2),

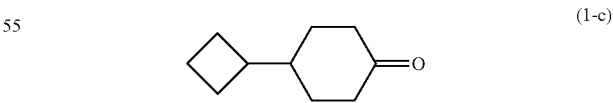

(1-c)

(correspondingly, H is cyclobutyl, and n is 1), and

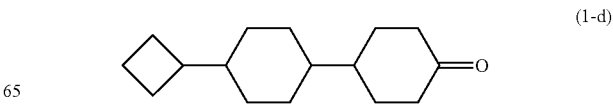

(1-d)

(correspondingly, H is cyclobutyl, and n is 2) are prepared as follows:

ether, and deprotected in the presence of formic acid in the solvent toluene at room temperature, to obtain

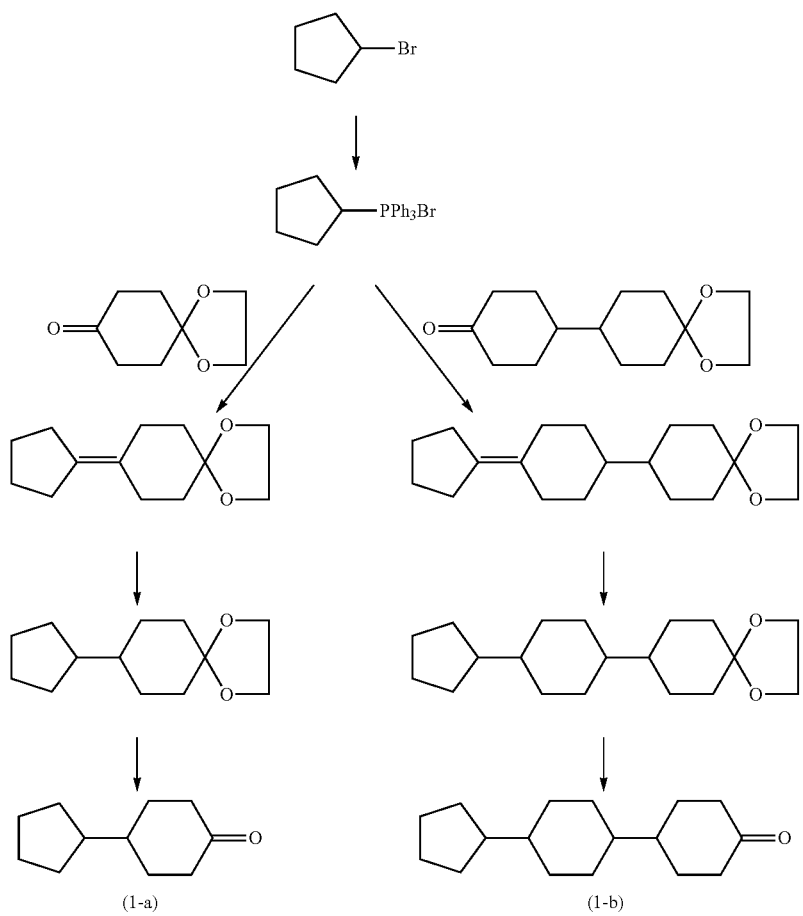

The synthesis process in the intermediate synthesis route 1 is described in connection with an example in which bromocyclopentane is used as a starting material.

Bromocyclopentane and triphenylphosphine are directly heated to 110° C. for 6 hrs in the absence of a solvent, and part of the unreacted raw material is dissolved in toluene, to obtain cyclopentyl triphenylphosphonium bromide. The resulting cyclopentyl triphenylphosphonium bromide is reacted with potassium tert-butoxide in the solvent tetrahydrofuran at 0° C. to generate the corresponding Ylide reagent, which undergoes Witting reaction with for 2-4 hrs. The solvent is directly removed by evaporation. The product intermediate alkene is extracted out with petroleum ether, which is hydrogenated in the solvent isopropanol in the presence of the catalyst Pd/C, with the alkene bond converted into a saturated bond. The trans-structured product is then recovered through recrystallization in petroleum ether, and deprotected in the presence of formic acid in the solvent toluene at room temperature, to obtain Following the same method By substituting bromocyclobutane for bromocyclopentane, is obtained.

Mass spectrometry results of (1-a) and (1-b) are as follows:
MS: m/z % 166 (M$^+$ 39) 137 (40) 125 (100) 69 (57.4)
MS: m/z % 248 (M$^+$ 84.4) 230 (26.5) 95 (100) 67 (72.9)

II. Synthesis Route 2:

A compound of Formula II is prepared, where ring B is 1,4-cyclohexyl, Z is —COO—, and n is 1 or 2.

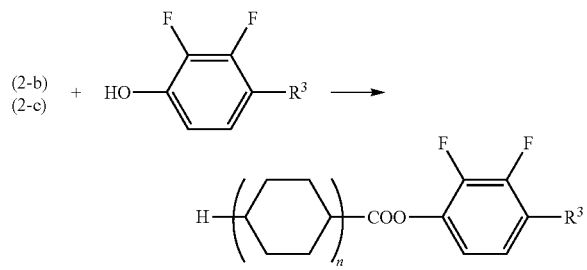

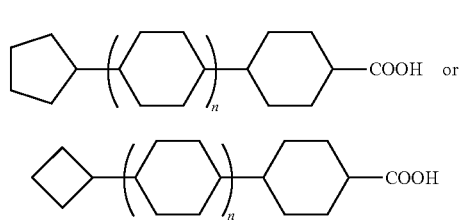

(n is 0 or 1 in each case) is dissolved in 100 ml dichloroethane, and then DCC (N,N-dicyclohexylcarbodiimide), and DMAP (4-dimethylaminopyridine) are added at 0° C., followed by a solution of

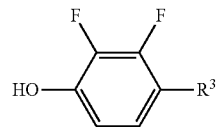

in dichloroethane, then subjected to esterification for 4 hrs with stirring at room temperature, and filtered to remove the precipitated by-product DCU. The filtrate is evaporated under reduced pressure to completely remove the solvent. The residue is dissolved in petroleum ether, purified by silica gel column chromatography, evaporated again under reduced pressure to completely remove the solvent, and then recrystallized in 100 ml ethanol (3×), to obtain a compound of Formula I in which ring B is 1,4-cyclohexyl, Z is —COO—, and n is 1 or 2.

III. Synthesis Route 3

A compound of Formula II is prepared, where ring B is 1,4-cyclohexyl, Z is —CH$_2$O—, and n is 1 or 2.

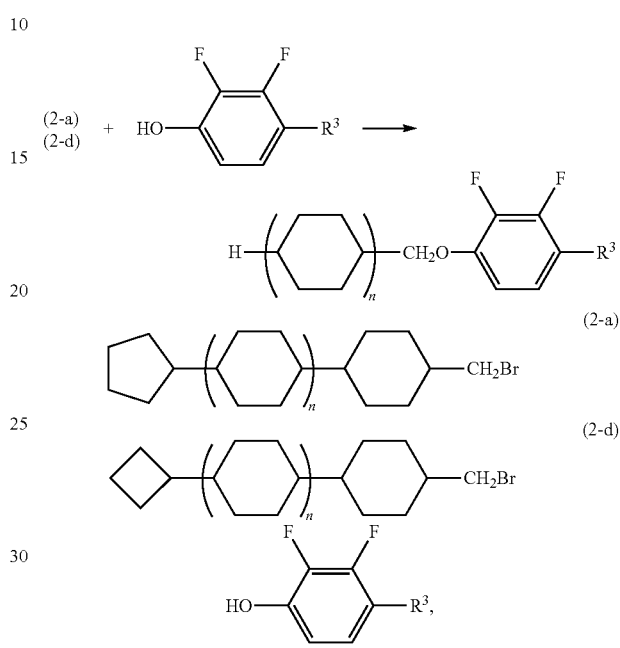

potassium carbonate, and the solvent ethanol are uniformly mixed and heated to reflux with stirring, to generate a potassium phenoxide. A solution of 2-a or 2-d (n is 0 or 1 in each case) in ethanol is added dropwise, and then etherificated for 4 hrs under reflux. The reaction solution is poured into water and extracted with diethyl ether. The organic phase is washed with water, evaporated to remove the solvent completely, dissolved in petroleum ether, purified by silica gel column chromatography, further evaporated to remove the solvent completely, and then recrystallized in ethanol, to obtain a compound of Formula I in which ring B is 1,4-cyclohexyl, Z is —CH$_2$O—, and n is 1 or 2

In Synthesis Routes 2 and 3, the intermediates 2-a, 2-b, 2-c, and 2-d used are prepared as follows:

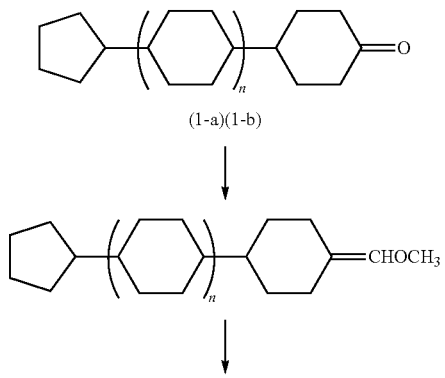

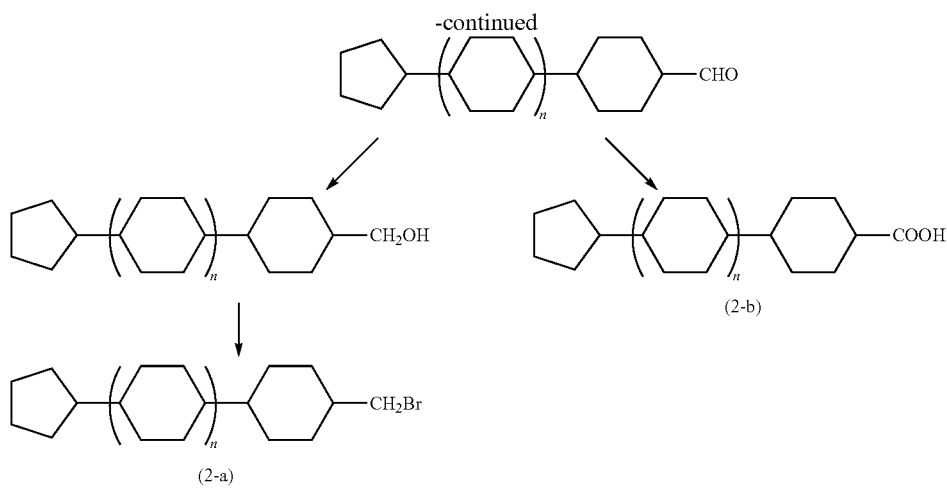

Following the same method, by substituting bromocyclobutane for bromocyclopentane,

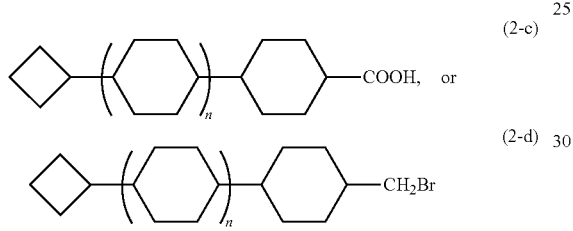

is obtained.

The preparation method above is specifically as follows.

1) Methoxymethylphosphonium chloride is reacted with potassium tert-butoxide in tetrahydrofuran at about 0° C., to generate the corresponding Ylide reagent, which undergoes Witting reaction with (1-a), (1-b), (1-c) or (1-d) for 2-4 hrs. The solvent is directly removed by evaporation. The product intermediate alkene is extracted out with petroleum ether, which is hydrolyzed in 2N dilute hydrochloric acid, to obtain the corresponding aldehyde. The cyclohexane attached to the formyl group has cis-trans isomerism. The trans-structured product aldehyde is recovered through recrystallization in petroleum ether. The trans-structured product aldehyde is oxidized to obtain an acid.

2) Reduction: the trans-structured product aldehyde is dissolved in tetrahydrofuran, and then an aqueous potassium borohydride solution is added dropwise at 0° C., and reacted for an additional 4 hrs after addition. Water is added, and the product is extracted out with diethyl ether, to obtain an alcohol.

3) Bromination: the alcohol is stirred with ½ mole of phosphorus tribromide overnight at 40° C., hydrolyzed, extracted with diethyl ether, and recrystallized in petroleum ether to obtain a bromide (2-a), (2-d).

4) Oxidation: the trans-structured product aldehyde is dissolved in acetic acid, and then 15% hydrogen peroxide is added dropwise, and reacted for an additional 4 hrs after addition. The reaction solution is diluted with water, and then the solid is filtered, and recrystallized in petroleum ether to obtain an acid (2-b), (2-c).

DSC of

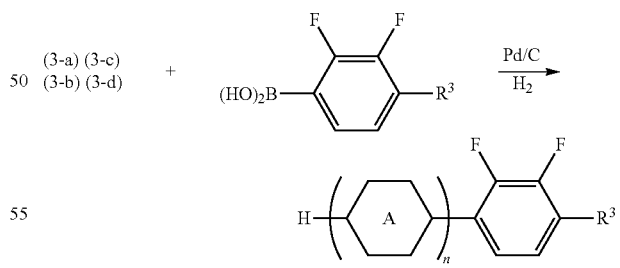

is 145-155° C.

DSC of

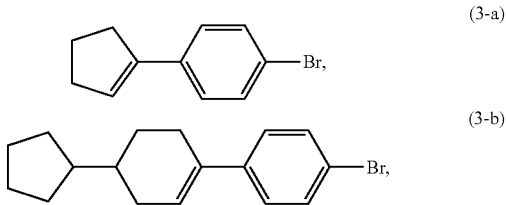

is 63.7-66.2° C., 61.1-163.4° C. Mass spectrometry results thereof:

MS: m/z % 196 (M⁺ 17.6) 178 (37.2) 127 (38.6) 109 (66.1) 81 (100) 67 (44.8)

IV. Synthesis Route 4:

A compound of Formula I is prepared, where ring B attached to Z is 1,4-phenylene or 1,4-phenylene substituted with fluoro, Z is a single bond, and n is 1 or 2.

-continued

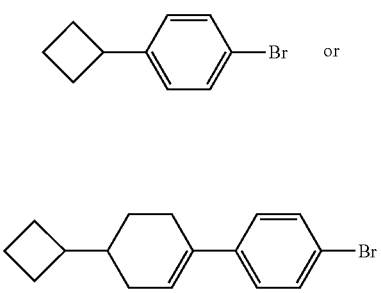
(3-c)

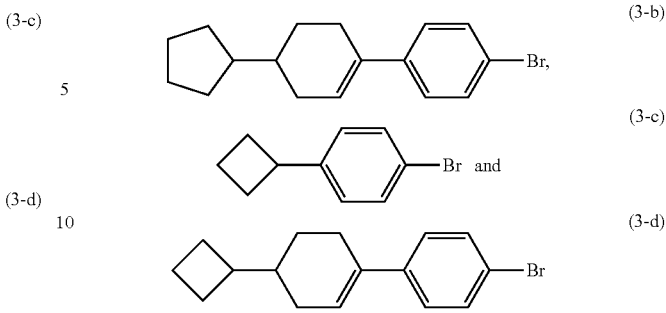
(3-b)
(3-c)
(3-d)

are prepared as follows.

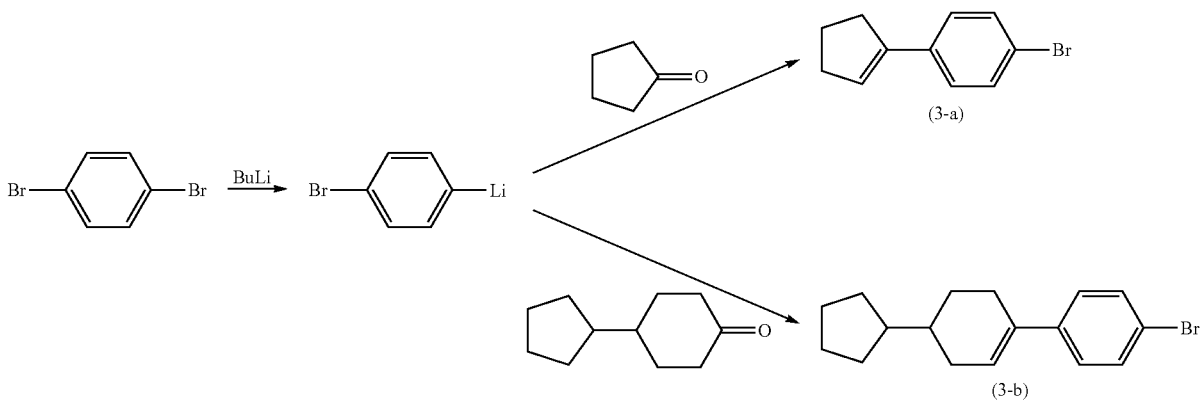
(3-a)
(3-b)

is uniformly mixed with

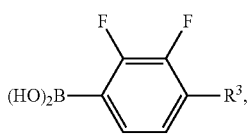

sodium carbonate, toluene, ethanol, water and tetrakis (triphenylphosphine)palladium, heated to reflux with stirring for SUZUKI reaction for 5 hrs. Then water is added and the organic phase is separated. The aqueous phase is extracted with toluene (1×). The organic phases are combined, washed 2 times with water, evaporated to completely remove the solvent, dissolved in petroleum ether, purified by silica gel column chromatography, and then recrystallized in petroleum ether, to obtain an intermediate.

2) The intermediate obtained in Step 1) is dissolved in toluene and ethanol, and hydrogenated for 8 hrs under normal pressure in the presence of Pd/C until the theoretical hydrogen absorption is attained. Then the Pd/C was filtered off, and the filtrate was evaporated under reduced pressure to remove the solvent, dissolved in petroleum ether, purified by silica gel column chromatography, and then recrystallized in petroleum ether, to obtain a compound of Formula I in which ring B attached to Z is 1,4-phenylene or 1,4-phenylene substituted with fluoro, Z is a single bond, and n is 1 or 2.

The intermediates

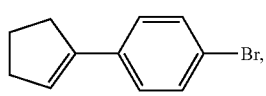
(3-a)

1,4-dibromobenzene is dissolved in tetrahydrofuran, then n-butyl lithium is added dropwise at −70° C., and then cyclopentanone, 4-cyclopentylcyclohexanone (1-a) or 4-cyclobutylcyclohexanone (1-c) is added dropwise 0.5 hr later, and hydrolyzed 1 hr after addition, extracted with diethyl ether, washed with water, evaporated to remove the solvent, dehydrated for 2 hrs in the solvent toluene in the presence of the catalyst p-toluene sulfonic acid, purified by silica gel column chromatography, and then recrystallized in petroleum ether, to obtain (3-a), (3-b) or

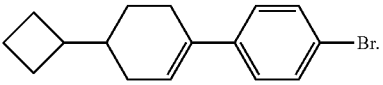
(3-d)

The method above is specifically as follows. 1,4-dibromobenzene is dissolved in tetrahydrofuran, and n-butyl lithium is added dropwise at −70° C. and then cyclobutanone is added dropwise 0.5 hr later, hydrolyzed for 1 hr after addition, extracted with diethyl ether, washed with water, evaporated to remove the solvent, reacted in the solvent dichloromethane for 4 hrs at −70° C. with stirring in the presence of triethyl silicane and boron trifluoride etherate, hydrolyzed, extracted with diethyl ether, purified by silica gel column chromatography, recrystallized in petroleum ether, and then filtered at a low temperature to obtain

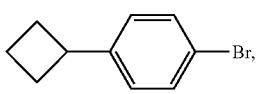
(3-c)

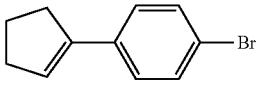
(3-a)

DSC: 98.7° C.

MS: m/z % 222 (M+ 45.6) 143 (100) 128 (78.8) 115 (36.6)

V. Synthesis Route 5:

A compound of Formula I is prepared, where ring B is 1,4-cyclohexyl, Z is —CH$_2$CH$_2$—, and n is 1 or 2.

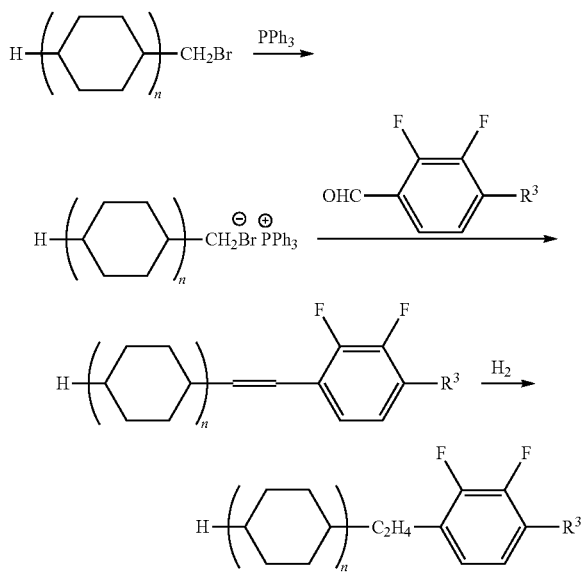

1)

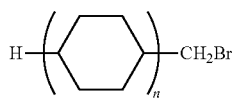

and triphenylphosphine are dissolved in toluene, heated to reflux for 6 hrs to form a salt, and then cooled to room temperature. The precipitated solid was filtered off, to obtain

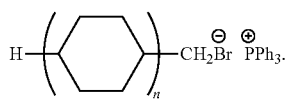

2)

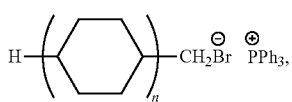

and tetrahydrofuran are cooled to −10° C., and then potassium tert-butoxide is added while the temperature is controlled below 0° C., to obtain a yellow solution. A solution of

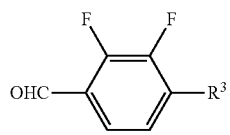

in tetrahydrofuran is added dropwise, and then subjected to Wittig reaction for 4 hrs. The reaction solution is poured into 400 ml water, and the organic phase is separated. The aqueous phase is extracted with 100 ml ethyl acetate (1×). The organic phases are combined, washed with water (1×), evaporated under reduced pressure to completely remove the solvent, extracted with petroleum ether (100 ml×4), purified by silica gel column chromatography, and then recrystallized in ethanol, to obtain

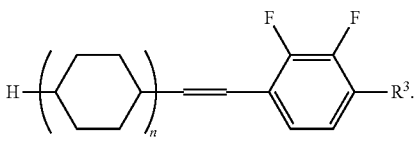

3) The

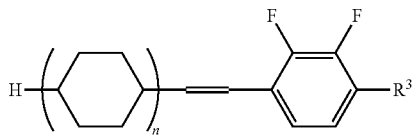

obtained in Step 2) is dissolved in toluene and ethanol, and hydrogenated for 6 hrs under normal pressure in the presence of Pd/C until the theoretical hydrogen absorption is attained. Then the Pd/C was filtered off, and the filtrate was purified by silica gel column chromatography, and then recrystallized in petroleum ether, to obtain a compound of Formula I in which ring B is 1,4-cyclohexyl, Z is —CH$_2$CH$_2$—, and n is 1 or 2.

Specifically,

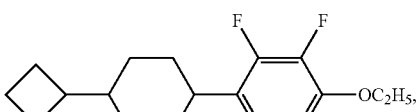

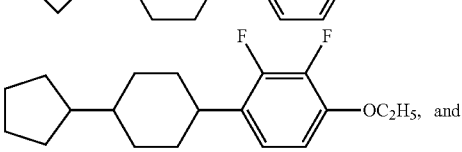
and

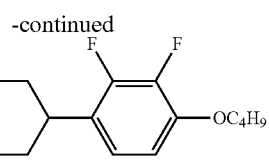

are prepared as follows.

Step 1:

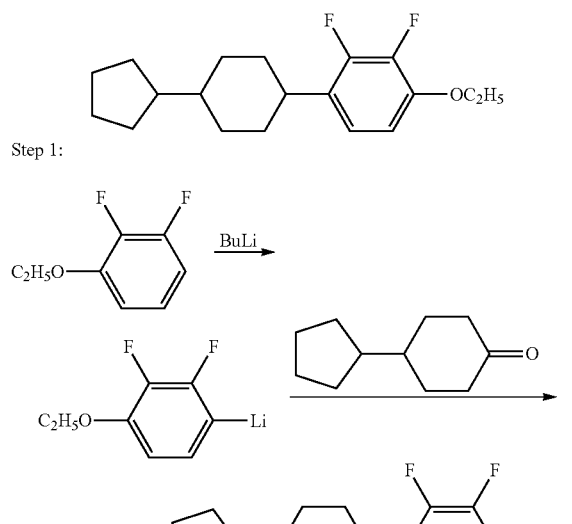

9.5 g (0.06 mol), 2,3-difluorophenetole, and 80 ml tetrahydrofuran are added to a 250 ml three-neck flask, purged with nitrogen, and cooled to −70° C. 27 ml (2.5 M) (0.065 mol) n-butyl lithium was added dropwise over 15 min, and the solution is still colorless and transparent after addition. Then 9.5 g (0.057 mol) 4-cyclopentylcyclohexanone (1-a) is added dropwise, and the solution appears light yellow after addition. The solution is naturally warmed to −30° C., and then poured into 100 ml water. After phase separation, the organic phase is separated, washed twice with water, and then directly evaporated to completely remove the solvent. The residue is added with 0.3 g p-toluene sulfonic acid and 100 ml toluene, and water was removed under reflux until no water was separated out after 1 hr. Then, it was purified by silica gel column chromatography, rinsed with petroleum ether, and then evaporated to completely remove the solvent, to obtain 17 g of a solid, which is recrystallized in 50 ml ethanol, to obtain 10 g of a light yellow crystal. Yield: 57%. GC: 99.1%.

Step 2:

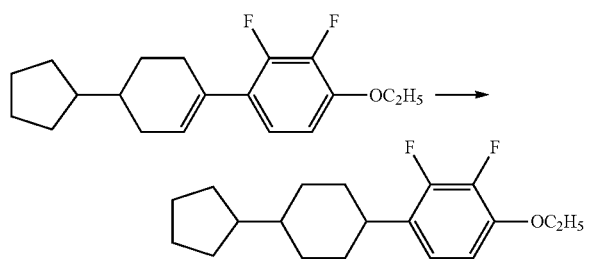

10 g of the product, that is, the light yellow crystal, obtained in Step 1 is dissolved in 20 ml toluene and 50 ml ethanol, added with 2 g of the catalyst Raney nickel, and hydrogenated for 10 hrs at normal temperature under normal pressure until the theoretical hydrogen absorption is attained. Then the catalyst Raney nickel is carefully filtered off, and the filtrate is evaporated to completely remove the solvent, dissolved in petroleum ether, purified by silica gel column chromatography, evaporated again to completely remove the solvent, recrystallised in ethanol at 10° C. (30 ml×3), to obtain a white crystal with a Gc purity of 99.92%.

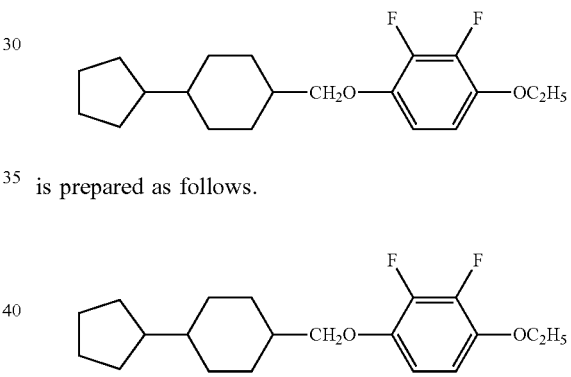

may be prepared following a method similar to above, except that a raw material having a different group is substituted.

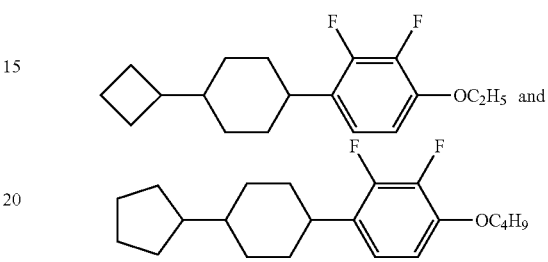

is prepared as follows.

8.7 g (0.05 mol) 2,3-difluoro-4-ethoxyphenol, and 8.3 g (0.06 mol) potassium carbonate are charged to a 250 ml three-neck flask, and then 60 mil of the solvent ethanol is added, and heated to reflux with stirring. A solution of 13.8 g 4-cyclopentylcyclohexylmethyl bromide (2-a, n=0) in 30 ml ethanol is added dropwise, and then refluxed for another 4 hrs after addition. The reaction solution is poured into 200 ml water, and extracted with diethyl ether. The organic phase is washed with water, evaporated to completely remove the solvent, dissolved in petroleum ether, purified by silica gel column chromatography, evaporated again to completely remove the solvent, and then recrystallized in 120 ml ethanol, to obtain 9.8 g of a white crystal. Gc: 99.90%. Yield: 58%. MP: 92.3-97.5° C. MS: m/z % 338 (M$^+$ 5.6), 174(100), 146 (37.2), 69 (4.9).

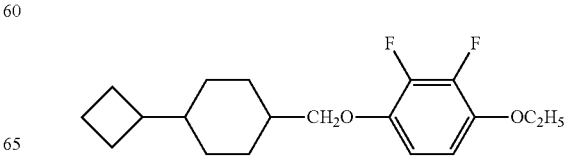

may be prepared following a method similar to above, except that a raw material having a different group is substituted.

The following examples are provided for illustrating, but not limiting the present invention. In the context, percentages are given in percent by weight (wt %), and all the temperatures are given in Celsius degree (° C.), unless specifically stated otherwise.

cp: clearing point [° C.]

Δn: optical anisotropy, tested at 25±2° C. and 589 nm

Δ∈: dielectric anisotropy, $\Delta\in=\in_\parallel-\in_{195}$, in which $\in_\parallel$ is the dielectric constant parallel to the molecule axis, and $\in_\perp$ is the dielectric constant perpendicular to the molecule axis, and which is tested at 25±2° C. and 1 KHz $K_{33}$: bend elastic constant [pN] of liquid crystal molecule, tested at 25±0.5° C.

$\gamma_1$: rotary viscosity [mPa·s], tested at 25±0.5° C.

τ: response time [ms], tested at 25±0.5° C.

VHR: voltage holding ratio, which is tested at 20±2° C., and at a voltage of ±5V, a pulse width of 10 ms, and a voltage holding time of 16.7 ms.

ρ: resistivity [Ω·cm], tested at 25±2° C.

Electro-optical test: a sample of a liquid crystal composition containing the polymerizable compound is placed in a VA type element of normally black mode with two glass substrates having a gap of 4 μm and an anti-parallel PI layer friction orientation for electro-optical test. A voltage of 20 V (60 Hz, square wave) is applied onto the VA type element added with the sample of the liquid crystal composition containing the polymerizable compound, and test is conducted after polymerization for 180 s under UV irradiation at an intensity of 70 mw/cm².

High-temperature resistivity test: a sample of a liquid crystal composition containing the polymerizable compound is placed in a high borosilicate glass bottle, and continuously heated at 100° C. for 1 hrs, and then recovered to 25° C. for test.

Example 1

The following amounts (in parts by weight) of the compounds of Formulas I, II and IV, and the compound $M_1$ of Formula III were uniformly mixed, to obtain a liquid crystal composition $P1M_1$ having a negative anisotropy.

Compound of Formula I:

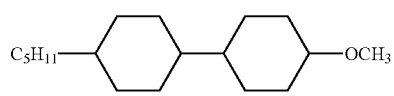
9

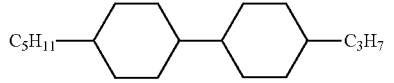
10

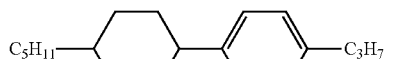
14

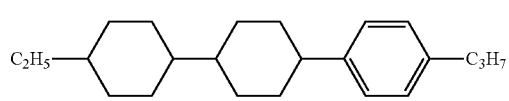
4

Compound of Formula II:

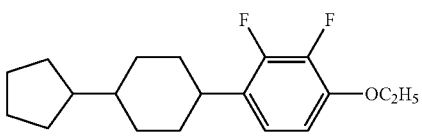
12

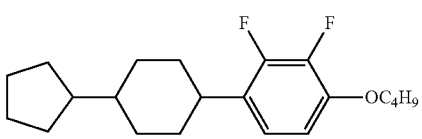
10

Compound of Formula IV:

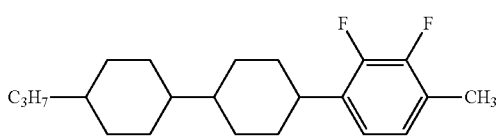
14

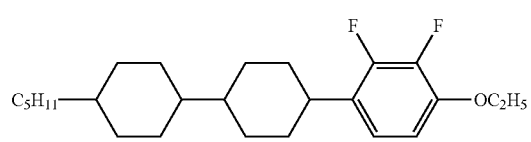
7

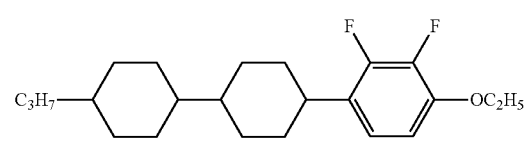
8

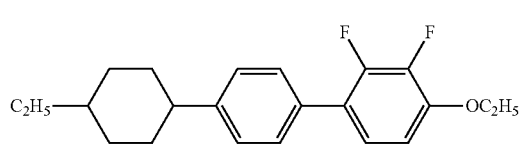
12

Compound $M_1$ of Formula III:

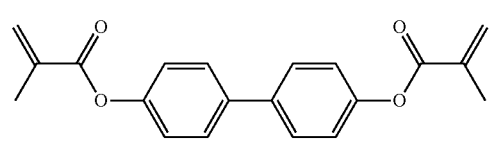
0.3

A liquid crystal composition $P1M_2$ having a negative dielectric anisotropy was obtained with the same components as above except that the compound of Formula $M_1$ was replaced by the compound of $M_2$.

Compound $M_2$ of Formula III

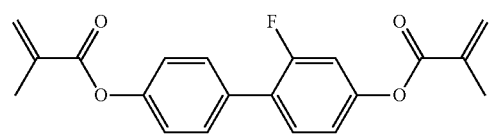
0.3

A liquid crystal composition $P1M_3$ having a negative dielectric anisotropy was obtained with the same components as above except that the compound of Formula $M_1$ was replaced by the compound of $M_3$.

Compound $M_3$ of Formula III

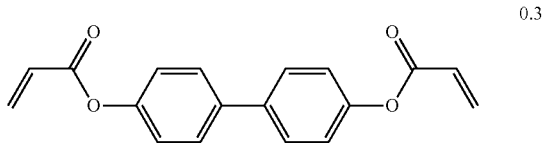

0.3

In addition, the compounds of Formulas I, II and Formula IV were uniformly mixed to obtain a liquid crystal composition N1 as control.

The liquid crystal performances of the liquid crystal compositions above were tested. The results are shown below.

Liquid crystal composition N1 as control: cp=75.8° C., $\Delta n$=0.0905, $\Delta \in$=−3.7, $K_{33}$=15.1, $\gamma 1$=133 mPa·s.

The detection results of the liquid crystal composition $P1M_1$ having a negative dielectric anisotropy, the liquid crystal composition $P1M_2$ having a negative dielectric anisotropy, and the liquid crystal composition $P1M_3$ having a negative dielectric anisotropy are the same as and have no substantial difference from above.

Furthermore, the liquid crystal compositions $P1M_1$, $P1M_2$, and $P1M_3$ and liquid crystal composition N1 are determined for VHR and $\rho$. The determination method is specifically as follows. The sample was placed in a VA type element of normally black mode with two glass substrates having a gap of 4 μm and an anti-parallel PI layer friction orientation. A voltage of 20 V (60 Hz, square wave) was applied onto the element, and the sample was polymerized for 180 s under UV irradiation at an intensity of 70 mw/cm², and determined for the voltage holding ratio VHR before and after UV irradiation and for the resistivity $\rho$ and voltage holding ratio VHR before and after high temperature treatment at 100° C. for 1 hr. The results are shown in Table 1.

TABLE 1

Changes in VHR and $\rho$ of N1, $P1M_1$, $P1M_2$ and $P1M_3$ before and after UV irradiation and high temperature treatment.

| | VHR | | $\rho$ (×10$^{13}$ Ω · cm) | |
| --- | --- | --- | --- | --- |
| | Before UV irradiation | After UV irradiation at 70 mw/cm² for 180 s | Before high temperature treatment | After high temperature treatment at 100° C. for 1 hr |
| N1 | 99.62% | 99.60% | 7.0 | 5.5 |
| $P1M_1$ | 99.60% | 99.60% | 7.6 | 5.0 |
| $P1M_2$ | 99.60% | 99.56% | 8.1 | 4.9 |
| $P1M_3$ | 99.57% | 99.53% | 6.8 | 5.7 |

As shown in Table 1, before and after the polymerizable compound of $M_1$, $M_2$ or $M_3$ of Formula III is added, the liquid crystal composition exhibits a high VHR, and after polymerization, the VHR is not decreased by the addition of the polymerizable compound $M_1$, $M_2$, or $M_3$. Thus, the liquid crystal composition displays an excellent UV stability. Meanwhile, a high resistivity $\rho$ and voltage holding ratio VHR are maintained after high temperature treatment at 100° C. for 1 hr compared with the resistivity $\rho$ and the voltage holding ratio VHR before high temperature treatment. Accordingly, the liquid crystal composition displays excellent high temperature stability.

Example 2

The following amounts (in parts by weight) of the compounds of Formulas I, II and IV, and the compound $M_1$ of Formula III were uniformly mixed, to obtain a liquid crystal composition $P2M_1$ having a negative anisotropy.

Compound of Formula I:

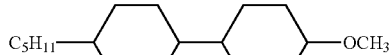

9

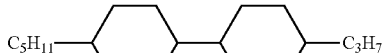

20

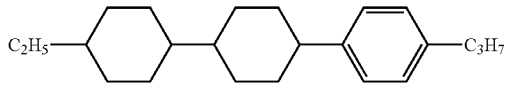

2

Compound of Formula II:

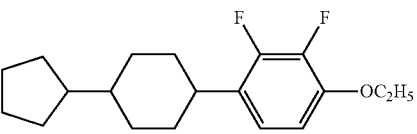

10

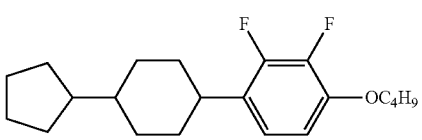

6

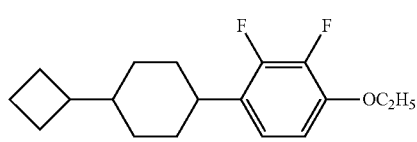

7

Compound of Formula IV:

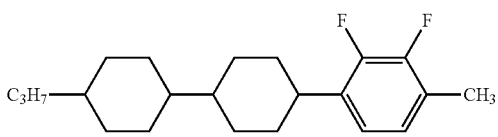

12

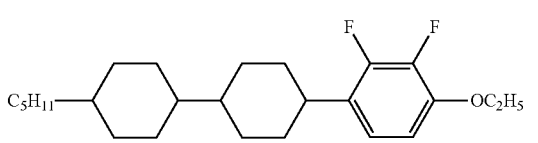

10

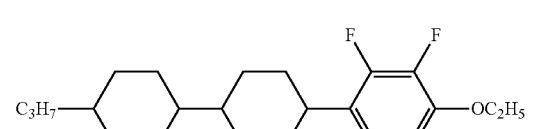

9

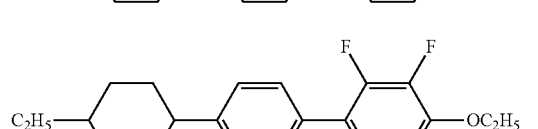

12

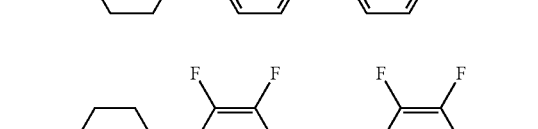

3

Compound M₁ of Formula III:

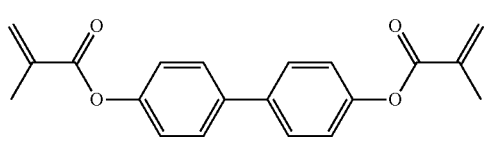
0.3

In addition, the compounds of Formulas I, II and Formula IV were uniformly mixed to obtain a liquid crystal composition N2 as control.

The liquid crystal performances of the liquid crystal compositions above were tested. The results are shown below.

Liquid crystal composition N2 as control: cp=88.5° C., Δn=0.0950, Δ∈=−3.96, $K_{33}$=15.6, γ1=157 mPa·s.

The detection results of the liquid crystal composition P2M₁ having a negative dielectric anisotropy are the same as and have no substantial difference from above.

Example 3

The following amounts (in parts by weight) of the compounds of Formulas I, II and IV, and the compound M₃ of Formula III were uniformly mixed, to obtain a liquid crystal composition P3M₁ having a negative anisotropy.

Compound of Formula I:

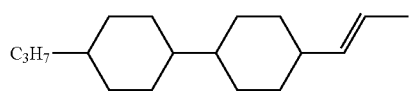
8

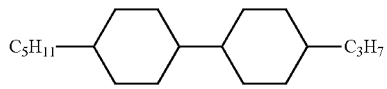
15

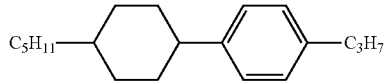
10

4

Compound of Formula II:

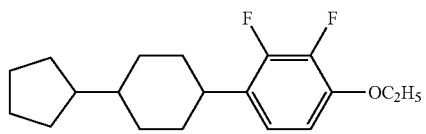
12

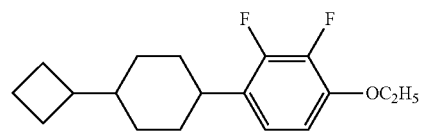
10

Compound of Formula IV:

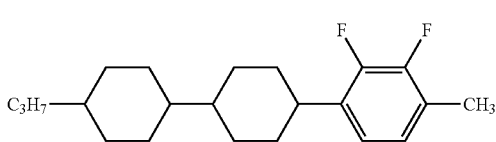
14

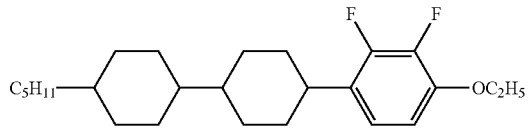
5

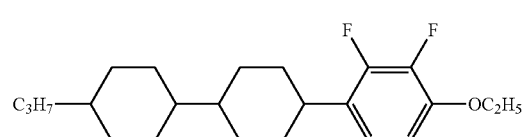
8

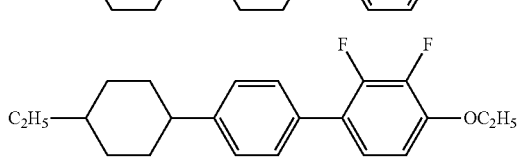
12

Compound M₁ of Formula III:

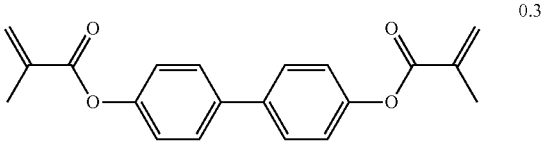
0.3

In addition, the compounds of Formulas I, II and Formula IV were uniformly mixed to obtain a liquid crystal composition N3 as control.

The liquid crystal performances of the liquid crystal compositions above were tested. The results are shown below.

Liquid crystal composition N3 as control: cp=70.3° C., Δn=0.0912, Δ∈=−3.7, $K_{33}$=14.8, γ1=134 mPa·s.

The detection results of the liquid crystal composition P3M₁ having a negative dielectric anisotropy are the same as and have no substantial difference from above.

Example 4

The following amounts (in parts by weight) of the compounds of Formulas I, II and IV, and the compound M₁ of Formula III were uniformly mixed, to obtain a liquid crystal composition P4M₁ having a negative anisotropy.

Compound of Formula I:

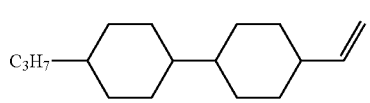
30

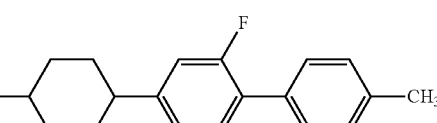
2

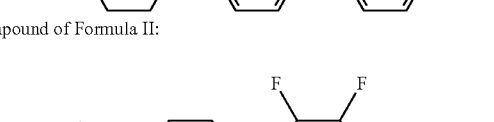
10

Compound of Formula II:

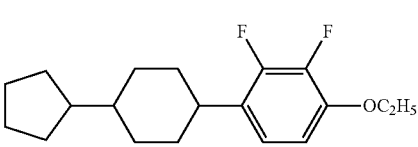
10

-continued

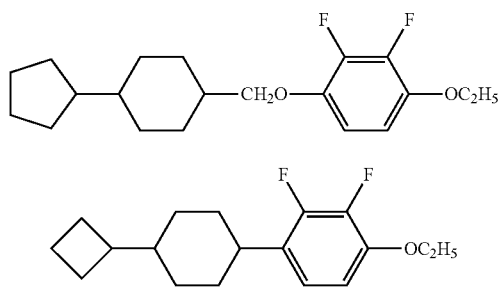
9

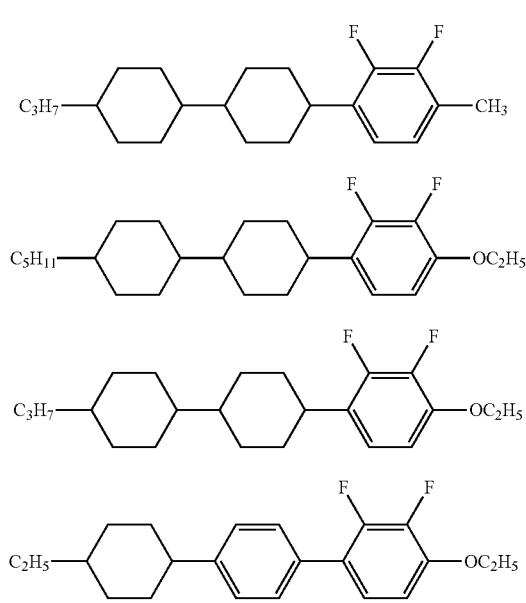
14
7
8
12

Compound M₁ of Formula III:

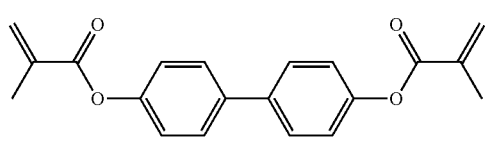
0.3

In addition, the compounds of Formulas I, II and Formula IV were uniformly mixed to obtain a liquid crystal composition N4 as control.

The liquid crystal performances of the liquid crystal compositions above were tested. The results are shown below.

Liquid crystal composition N4 as control: cp=75.6° C., Δn=0.0955, Δ∈=−3.7, $K_{33}$=14.4 pN, $γ_1$=121 mPa·s.

The detection results of the liquid crystal composition P4M₁ having a negative dielectric anisotropy are the same as and have no substantial difference from above.

Example 5

The following amounts (in parts by weight) of the compounds of Formulas I, II and IV, and the compound M₁ of Formula III were uniformly mixed, to obtain a liquid crystal composition P5M₁ having a negative anisotropy.

Compound of Formula I:

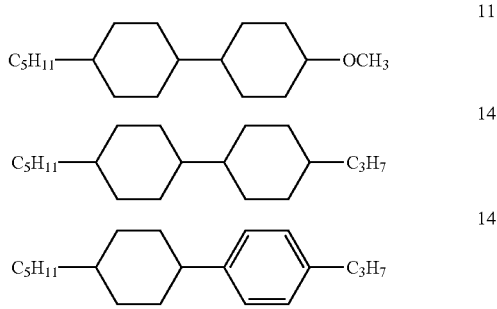
11
14
14

Compound of Formula II:

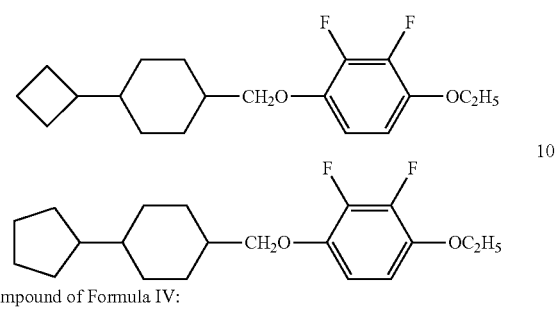
10
10

Compound of Formula IV:

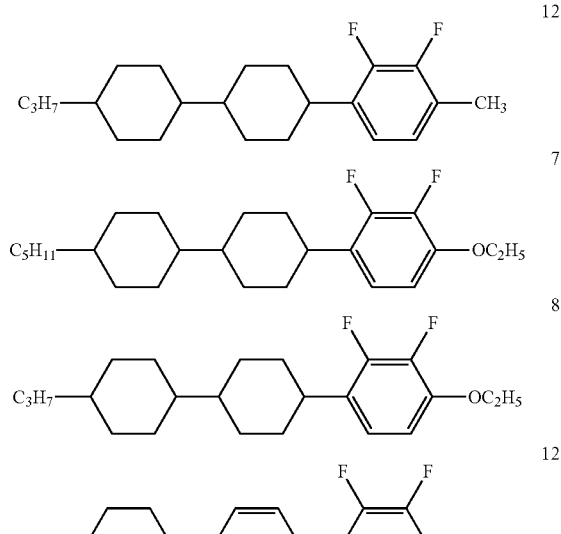
12
7
8
12
2

Compound M₁ of Formula III:

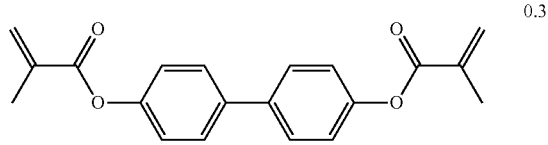
0.3

In addition, the compounds of Formulas I, II and Formula IV were uniformly mixed to obtain a liquid crystal composition N5 as control.

The liquid crystal performances of the liquid crystal compositions above were tested. The results are shown below.

Liquid crystal composition N5 as control: cp=73.9, Δn=0.0934, Δ∈=−3.3, $K_{33}$=15.4, $\gamma_1$=128 mPa·s.

The detection results of the liquid crystal composition P5M$_1$ having a negative dielectric anisotropy are the same as and have no substantial difference from above.

Example 6

The following amounts (in parts by weight) of the compounds of Formulas I, II and IV, and the compound M$_1$ of Formula III were uniformly mixed, to obtain a liquid crystal composition P6M$_1$ having a negative anisotropy.

Compound of Formula I:

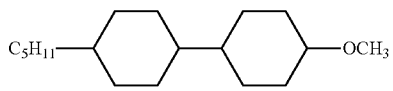
9

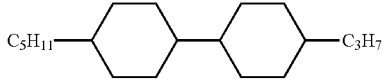
10

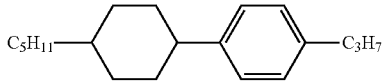
14

4

Compound of Formula II:

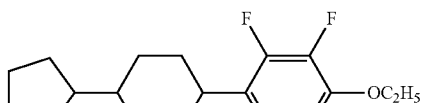
10

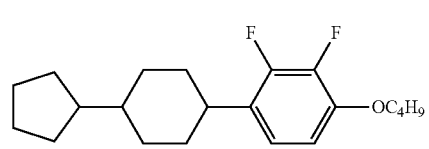
8

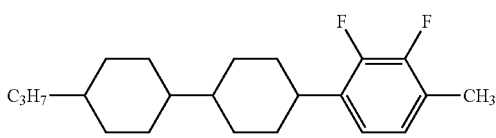
14

-continued

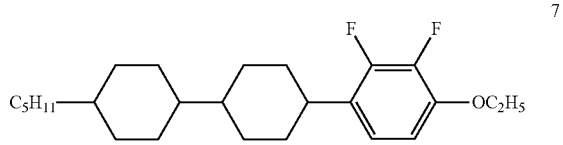
7

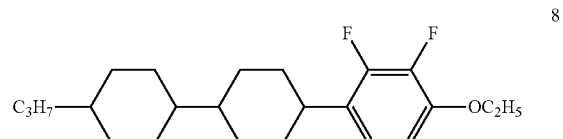
8

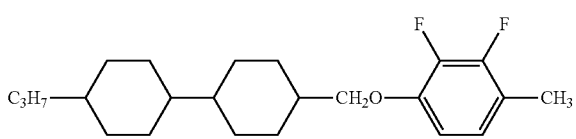
4

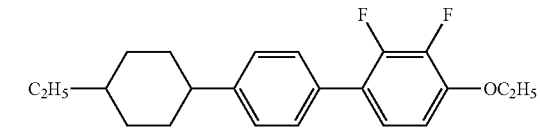
12

Compound M$_1$ of Formula III:

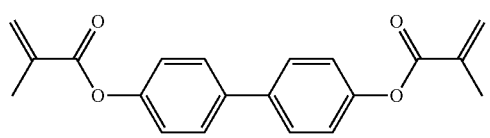
0.3

In addition, the compounds of Formulas I, II and Formula IV were uniformly mixed to obtain a liquid crystal composition N6 as control.

The liquid crystal performances of the liquid crystal compositions above were tested. The results are shown below.

Liquid crystal composition N6 as control: cp=77.8° C., Δn=0.0917, Δ∈=−3.8, $K_{33}$=15.2, γ1=138 mPa·s.

The detection results of the liquid crystal composition P6M$_1$ having a negative dielectric anisotropy are the same as and have no substantial difference from above.

The liquid crystal compositions P2M$_1$, P3M$_1$, P4M$_1$, P5M$_1$, P6M$_1$, N2, N3, N4, N5, and N6 obtained in Examples 2-6 were determined for electro-optical performances. The determination method is specifically as follows. The sample was placed in a VA type element of normally black mode with two glass substrates having a gap of 4 μm and an anti-parallel PI layer friction orientation. A voltage of 20 V (60 Hz, square wave) was applied onto the element, and the sample was polymerized for 180 s under UV irradiation at an intensity of 70 mw/cm², and determined for the electro-optical performances. The results are shown in Table 2.

TABLE 2

Electro-optical performance of liquid crystal compositions N2-N6 and P2M$_1$-P6M$_1$.

|  | N2 | P2M$_1$ | N3 | P3M$_1$ | N4 | P4M$_1$ | N5 | P5M$_1$ | N6 | P6M$_1$ |
|---|---|---|---|---|---|---|---|---|---|---|
| Δn | 0.0950 | 0.0950 | 0.0912 | 0.0912 | 0.0955 | 0.0955 | 0.0934 | 0.0934 | 0.0917 | 0.0917 |
| Δ∈ | −3.9 | −3.9 | −3.7 | −3.7 | −3.7 | −3.7 | −3.3 | −3.3 | −3.8 | −3.8 |
| τ [ms] | 21.5 | 17.2 | 23.7 | 20.1 | 18.4 | 16.5 | 18.9 | 16.4 | 23.9 | 19.8 |

It can be known from the table that the optical and dielectric anisotropy of the liquid crystal compositions are not altered by the addition of the polymerizable compound $M_1$, and upon polymerization with applied voltage under UV irradiation, the response time of $P2M_1$, $P3M_1$, $P4M_1$, $P5M_1$, and $P6M_1$ obtained after the polymerizable compound is added is obviously accelerated.

Following the method in Example 1, the liquid crystal compositions $P2M_1$, $P3M_1$, $P4M_1$, $P5M_1$, $P6M_1$, N2, N3, N4, N5, and N6 were determined for VHR and ρ. The results are shown in Table 3 below.

TABLE 3

Changes in VHR and ρ of N2, N3, N4, N5, N6, $P2M_1$, $P3M_1$, $P4M_1$, $P5M_1$ and $P6M_1$ before and after UV irradiation and high temperature treatment.

| | VHR | | ρ (×10$^{13}$ Ω · cm) | |
|---|---|---|---|---|
| | Before UV irradiation | After UV irradiation at 70 mw/cm² for 180 s | Before high temperature treatment | After high temperature treatment at 100° C. for 1 hr |
| N2 | 99.58% | 99.56% | 6.8 | 5.4 |
| N3 | 99.60% | 99.55% | 7.5 | 5.7 |
| N4 | 99.55% | 99.53% | 6.0 | 5.4 |
| N5 | 99.60% | 99.57% | 6.2 | 5.6 |
| N6 | 99.56% | 99.51% | 7.1 | 5.9 |
| $P2M_1$ | 99.56% | 99.52% | 6.5 | 4.5 |
| $P3M_1$ | 99.54% | 99.51% | 7.6 | 5.1 |
| $P4M_1$ | 99.51% | 99.45% | 5.7 | 3.2 |
| $P5M_1$ | 99.54% | 99.50% | 6.0 | 4.3 |
| $P6M_1$ | 99.51% | 99.47% | 6.8 | 4.9 |

It can be known from above that before and after the polymerizable compound of Formula III is added, the liquid crystal composition exhibits a high VHR, and after polymerization, VHR is not significantly decreased by the addition of the polymerizable compound. Moreover, the liquid crystal composition still exhibits a high resistivity after high-temperature treatment. Therefore, the liquid crystal compositions have excellent high temperature and UV stability. Furthermore, the liquid crystal compositions in the examples also show a low viscosity, a fast response time, and a suitable optical and dielectric anisotropy, thus being applicable to an electro-optical display with active matrix addressing.

Example 7

The following amounts (in parts by weight) of the compounds of Formulas I, II and IV, and the compound $M_1$ of Formula III were uniformly mixed, to obtain a liquid crystal composition $P7M_1$ having a negative anisotropy.

Compound of Formula I:

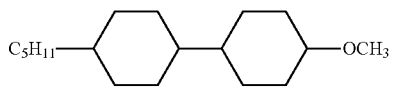

9

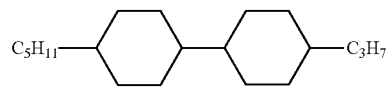

8

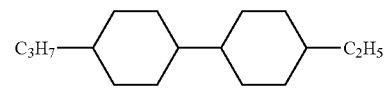

5

-continued

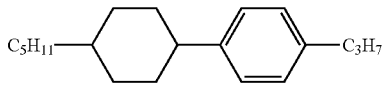

14

4

Compound of Formula II:

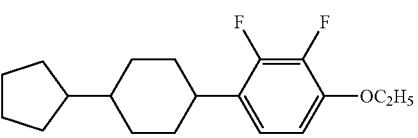

15

Compound of Formula IV:

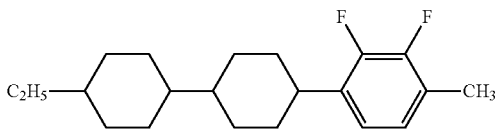

10

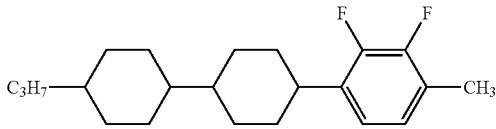

10

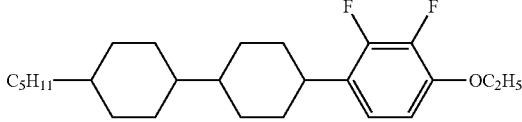

7

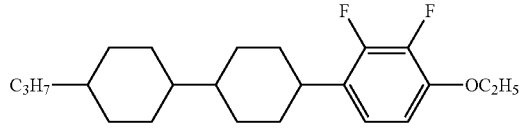

8

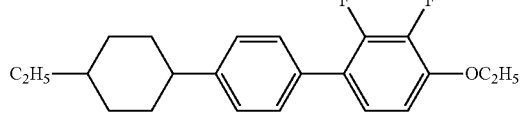

8

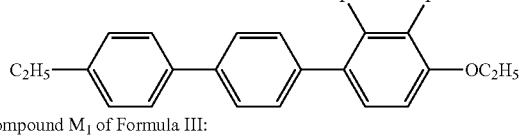

2

Compound $M_1$ of Formula III:

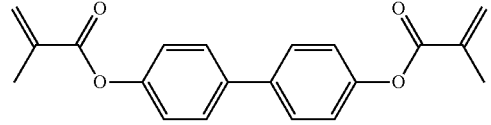

0.3

In addition, the above amounts (in parts by weight) of the compounds of Formulas I and IV and the compound $M_1$ of Formula III were uniformly mixed to obtain a liquid crystal composition $P8M_1$ as control.

The liquid crystal performances of the liquid crystal compositions $P7M_1$ and $P8M_1$ were tested. The results are shown below.

Liquid crystal composition P7M$_1$: cp=78.4° C., Δn=0.0916, Δ∈=−3.2, K$_{33}$=14.3, γ1=118 mPa·s; P8M$_1$: cp=75.6° C., Δn=0.0886, Δ∈=−2.8, K$_{33}$=13.9, γ1=125 mPa·s.

It can be known from above that the addition of the compound of Formula II can promote the increase of the clearing point, optical anisotropy and dielectric anisotropy of the liquid crystal compositions, and that the compound of such a Structural Formula II also has a high K$_{33}$ and a low rotary viscosity γ1.

Comparative Example 1

The following amounts (in parts by weight) of the compounds of Formulas I, II and IV, and the compound M$_1$ of Formula III were uniformly mixed, to obtain a liquid crystal composition P9M$_1$ having a negative anisotropy.

Compound of Formula I:

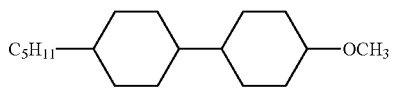

9

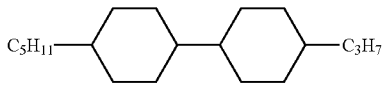

10

4

Compound of Formula II:

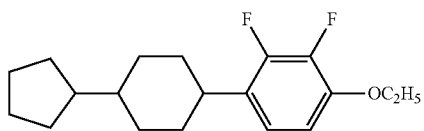

8

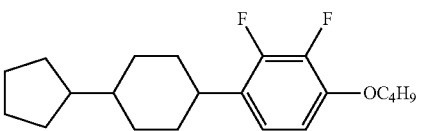

10

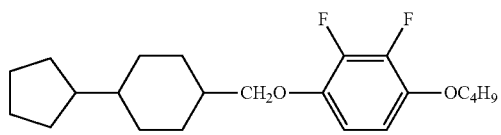

14

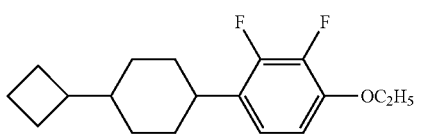

17

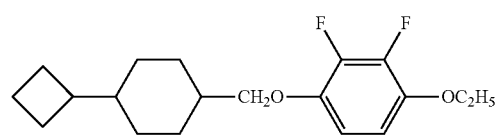

12

Compound of Formula IV:

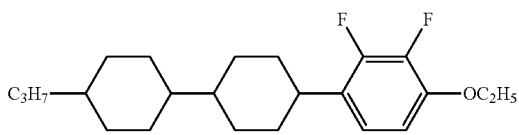

8

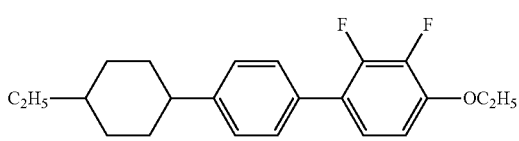

8

Compound M$_1$ of Formula III:

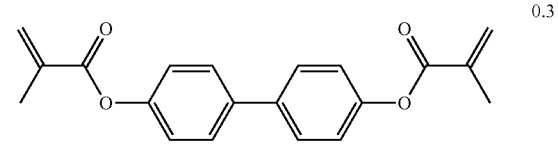

0.3

In addition, the above amounts (in parts by weight) of the compounds of Formulas I and IV and the compound M$_1$ of Formula III were uniformly mixed to obtain a liquid crystal composition N9 as control.

The liquid crystal performances of the liquid crystal compositions P9M$_1$ and N9 were tested. The results are shown below.

Liquid crystal composition N9 as control: cp=64.2° C., Δn=0.0970, Δ∈=−4.2, K$_{33}$=15.5, γ1=217 mPa·s.

The detection results of the liquid crystal composition P9M$_1$ are the same as and have no substantial difference from above.

It can be known from above that because the compound of Formula II is present in high parts by weight of 61 in the liquid crystal composition P9M$_1$, and has a relatively low clearing point, the amount of neutral molecules added needs be lowered, thus causing the rotary viscosity of the liquid crystal composition to dramatically increase. In addition, the compound of Formula II of excessively high content easily leads to the generation of a smectic phase, which causes limitations to the application of the liquid crystal composition.

Following the method in Example 1, the liquid crystal compositions P9M$_1$ and N9 were determined for the VHR and ρ. The results are shown in Table 5 below.

TABLE 5

Changes in VHR and ρ of N9 and P9M$_1$ before and after UV irradiation and high temperature treatment.

| | VHR | | ρ (×10$^{13}$ Ω·cm) | |
|---|---|---|---|---|
| | Before UV irradiation | After UV irradiation at 70 mw/cm$^2$ for 180 s | Before high temperature treatment | After high temperature treatment at 100° C. for 1 hr |
| N9 | 99.50% | 99.32% | 5.4 | 2.8 |
| P9M$_1$ | 99.51% | 99.30% | 5.1 | 1.9 |

It can be known from the table that before and after the polymerizable compound M$_1$ of Formula III is added, the resistivity and VHR of the liquid crystal composition is markedly lowered after high temperature treatment and polymerization under UV irradiation. Therefore, the compound of Formula II of excessively high content may affect the overall performances of the liquid crystal composition.

Example 8

To the liquid crystal composition P1M$_1$ obtained in Example 1, 0.02% of the compound of Formula VI

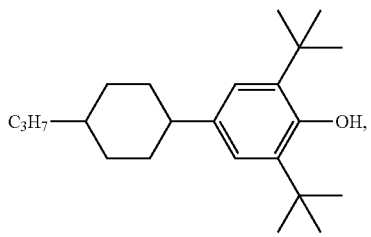

and 0.006% of the initiator Irgacure 651 (available from BASF of Germany, CAS No.: 24650-42-8), based on the total weight of P1M$_1$, were added and uniformly mixed to obtain a liquid crystal composition P10M$_1$.

The liquid crystal composition was polymerized under UV irradiation following the method in Example 1. The VHR and resistivity before and after high temperature treatment and polymerization under UV irradiation were determined, and compared. The results are shown in Table 6.

TABLE 6

Changes in VHR and ρ of P10M$_1$ before and after UV irradiation and high temperature treatment

| | VHR | | ρ (×10$^{13}$ Ω · cm) | |
| --- | --- | --- | --- | --- |
| | Before UV irradiation | After UV irradiation at 70 mw/cm$^2$ for 180 s | Before high temperature treatment | After high temperature treatment at 100° C. for 1 hr |
| P10M$_1$ | 99.58% | 99.56% | 7.0 | 5.0 |

It can be known from the data in the table that after the addition of the antioxidant of Formula VI and the initiator, the VHR and resistivity before and after high temperature treatment and polymerization have no obvious difference from those of the liquid crystal composition P1M$_1$ in Example 1.

INDUSTRIAL APPLICABILITY

In the liquid crystal composition provided in the present invention, the polymerizable compounds of Formulas I, II and III are combined with the compound of Formula IV, such that the resulting composition has a low threshold voltage, a low rotary viscosity, a high resistivity, a high voltage holding ratio, and a good high temperature and UV stability. The LC medium has the advantage of obviously reduced response time after polymerization under UV irradiation, thus having important application value.

What is claimed is:
1. A liquid crystal composition, comprising compounds of Formulas I to IV:

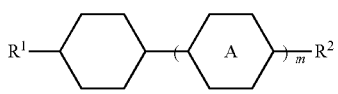

Formula I

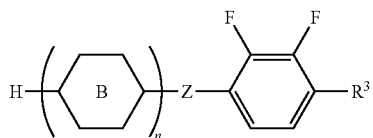

Formula II

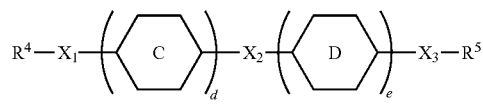

Formula III

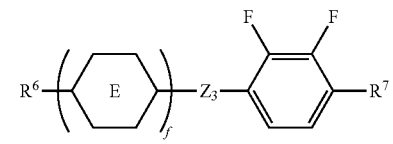

Formula IV wherein
in Formula I, R$^1$ and R$^2$ are each selected from a group a or b below, in which:
  a is selected from at least one of C1-C12 alkyl, C1-C12 alkyl substituted with fluoro or chloro, C1-C12 alkoxy, C1-C12 alkoxy substituted with fluoro or chloro, H and —CH=CH$_2$; and
  b is a group formed by substituting at least one —CH$_2$— in the group a with at least one of the groups below: —CH=CH— and —O—;

is selected from at least one of 1,4-phenylene, 1,4-phenylene monosubstituted with fluoro or chloro, 1,4-cyclohexyl, and a group formed by substituting one or two —CH$_2$— in 1,4-cyclohexyl with O; and
  m is 1 or 2;
in Formula II, H is cyclopentyl or cyclobutyl;

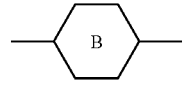

is as defined for

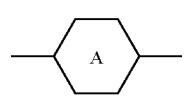

in Formula I;
Z is selected from at least one of a single bond, —COO—, —CH$_2$—O— and —CH$_2$CH$_2$—;

R³ is selected from at least one of C1-C6 alkyl or C1-C6 alkoxy; and
n is 1 or 2;
in Formula III, R⁴ and R⁵ are each selected from C2-C12 alkenyl, C2-C12 alkenyl substituted with halo, acrylate, methacrylate, ethenyloxy, propenyloxy, oxiranyl, oxetanyl and ketenyl, and at least one of R⁴ and R⁵ is acrylate, methacrylate, ethenyloxy, propenyloxy, oxiranyl, oxetanyl or ketenyl;

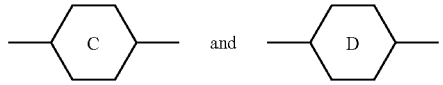

are each selected from a group g or h below, in which:
g is selected from at least one of 1,4-phenylene, 1,4-phenylene substituted with fluoro, 1,4-cyclohexyl, a group formed by substituting one or two —CH₂— in 1,4-cyclohexyl with O or S, 3,7-dibenzofuranyl, 1,4-bicyclo[2,2,2]octylene, piperidin-1,4-diyl, naphthalen-2,6-diyl, decahydronaphthalen-2,6-diyl, 1,2,3,4-tetrahydronaphthalen-2,6-diyl and indan-2,5-diyl; and
h is a group formed by substituting at least one hydrogen in the group g with at least one of the groups below: F, Cl, C1-C7 alkyl, C1-C7 alkoxy, C1-C7 alkylcarbonyl, C1-C7 alkoxycarbonyl and C1-C7 alkylcarbonyloxy;
X₁ and X₃ are each selected from at least one of —O—, —S—, —OCH₂—, —CH₂—O—, —CO—, —COO—, —OCO—, —OCO—O—, —CH₂CH₂—, a single bond, C1-C12 alkylene, a group formed by substituting at least one —CH₂— in C1-C12 alkylene with —O—, and C2-C12 alkylene substituted with halo;
X₂ is a single bond, —OCH₂—, —CH₂—O—, —CO—, —COO—, —OCO—, —OCO—O— or —CH₂CH₂—;
d and e are each an integer of 0-3; and
in Formula IV, R⁶ and IC are each a group j or k, in which:
j is selected from at least one of C1-C8 alkyl, C1-C8 alkyl substituted with fluoro or chloro, C1-C8 alkoxy and C1-C8 alkoxy substituted with fluoro or chloro, H, —CH=CH₂ and —CH=CH—CH₃; and
k is a group formed by substituting at least one —CH₂— in the group j with at least one of the groups below: —CH=CH—, —COO—, —OOC— or —O—;

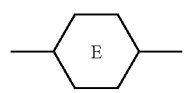

is selected from at least one of 1,4-phenylene, 1,4-phenylene substituted with fluoro, 1,4-cyclohexyl, and a group formed by substituting one or two —CH₂— in 1,4-cyclohexyl with O;
Z₃ is a single bond, —COO—, —CH₂—O—, —CH₂CH₂— or —CH₂—; and
f is 2 or 3.

2. The composition of claim 1, wherein the liquid crystal composition consists of the compounds of Formulas I to IV.

3. The composition of claim 1, wherein the weight ratio of the compounds of Formulas I, II, III and IV is 5-60:1-60:0.1-5:1-80.

4. The composition of claim 1, wherein the compound of Formula III is any one of the compounds of Formulas III-1 to III-32:

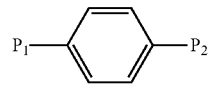
(III-1)

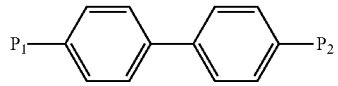
(III-2)

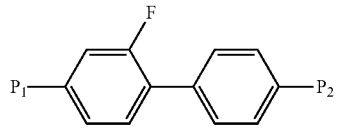
(III-3)

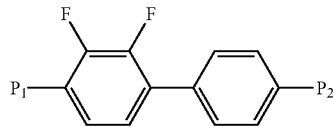
(III-4)

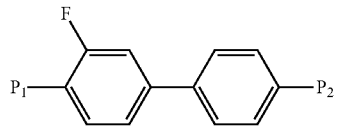
(III-5)

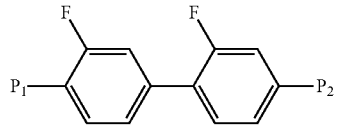
(III-6)

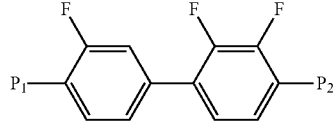
(III-7)

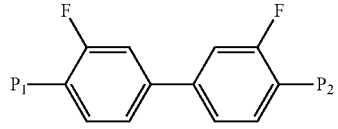
(III-8)

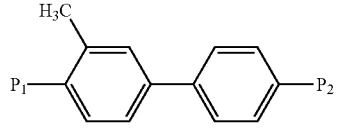
(III-9)

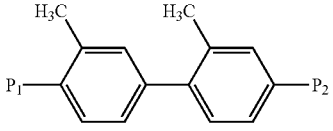
(III-10)

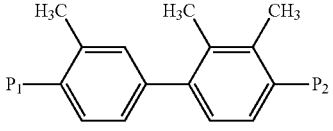
(III-11)

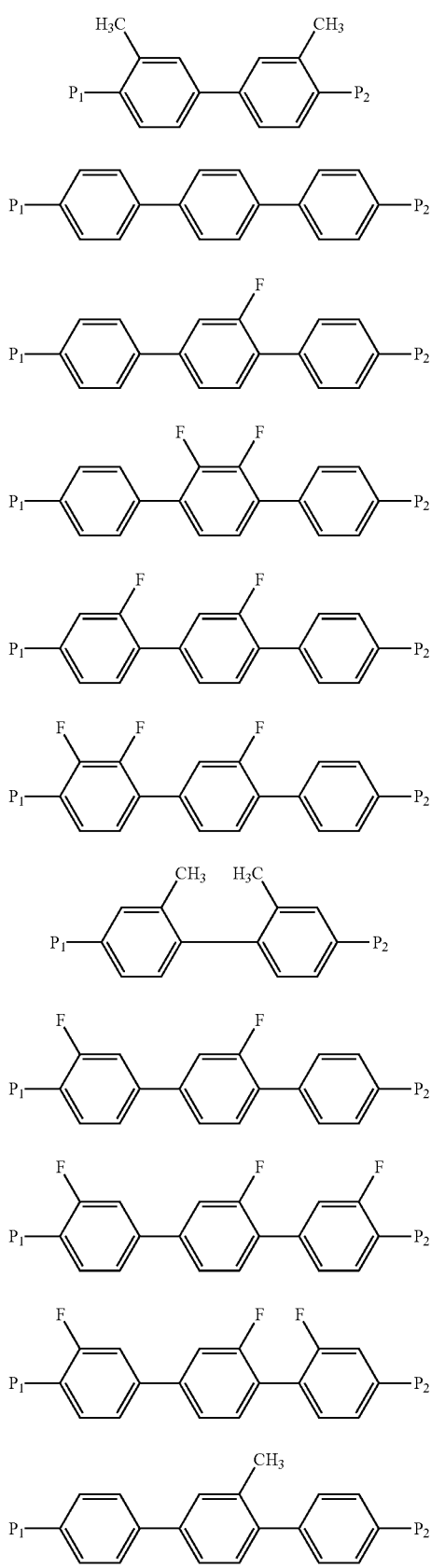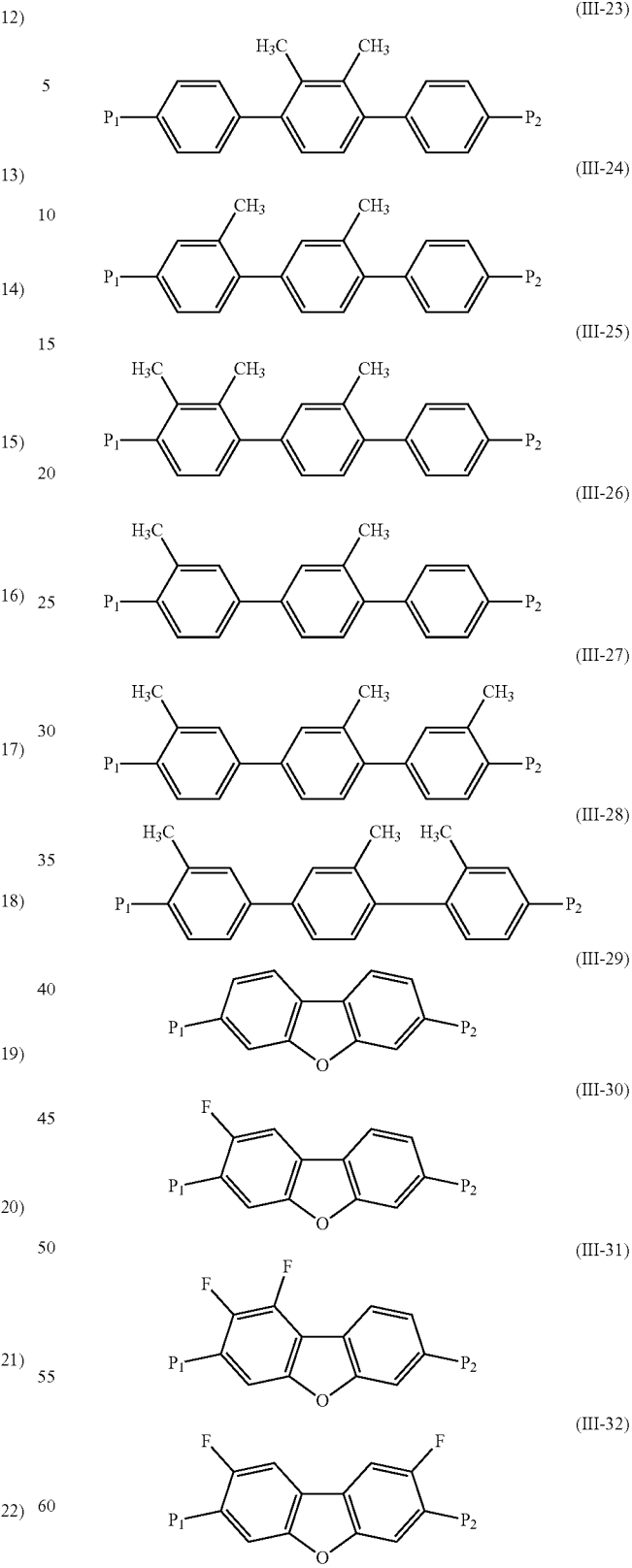
wherein $P_1$ and $P_2$ are selected from C2-C12 alkenyl, C2-C12 alkenyl substituted with halo, acrylate, methacrylate, ethenyloxy, propenyloxy, oxiranyl, oxetanyl, and ketenyl, and at least one of $P_1$ and $P_2$ is acrylate, methacrylate, ethenyloxy, propenyloxy, oxiranyl, oxetanyl or ketenyl and the compound of Formula IV is selected from any one of the compounds of Formulas IV-1 to IV-10:

IV-1
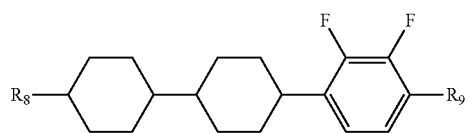

IV-2
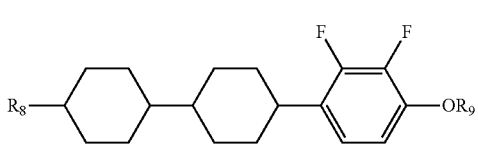

IV-3
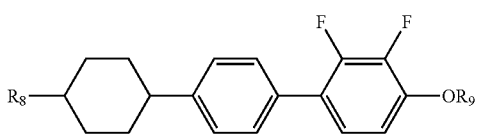

IV-4
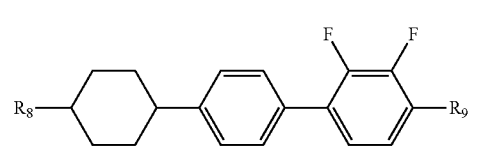

IV-5
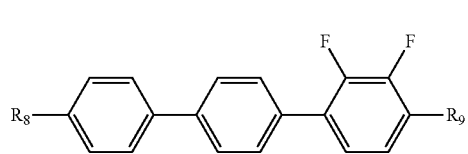

IV-6
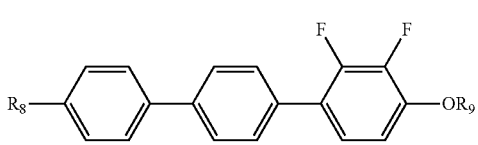

IV-7
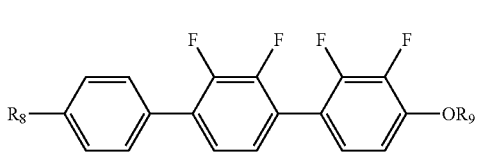

IV-8
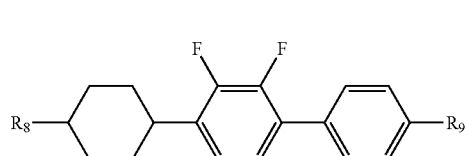

IV-9
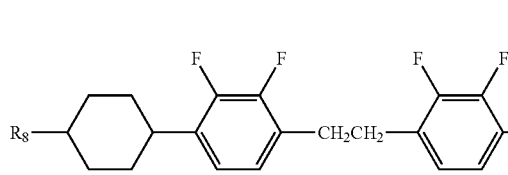

IV-10
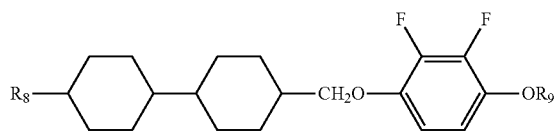

wherein in Formulas IV-1 to IV-10, $R^8$ and $R^9$ are each selected from at least one of C1-C8 alkyl groups.

5. The composition of claim 1, wherein the liquid crystal composition consists of 1 to 5 compounds of Formula I, 1 to 6 compounds of Formula II, 1 to 2 compounds of Formula III and 1 to 6 compounds of Formula IV.

6. The composition of claim 1, wherein the composition further comprises at least one of the following components: a compound of Formulas V, a compound of VI, and an initiator;

Formula V
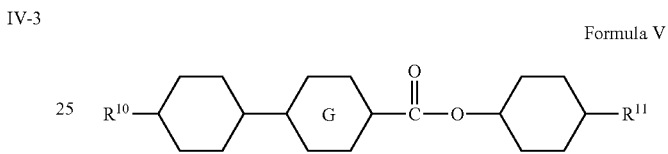

wherein in Formula V, $R^{10}$ and $R^{11}$ are each selected from at least one of C1-C8 alkyl groups; and

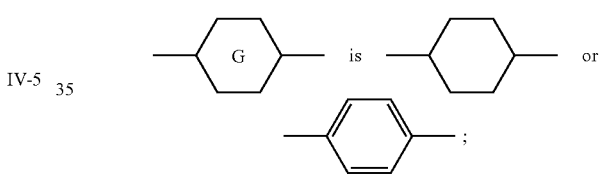

the compound of Formula V is present in an amount of 1-40% based on the total weight of the composition;

Formula VI
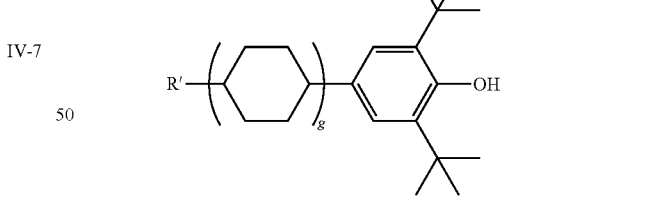

in Formula VI, R' is selected from at least one of C1-C8 alkyl or C1-C8 alkoxy; and g is an integer of 0-2;

the compound of Formula VI is present in an amount of 0.001-0.1% based on the total weight of the composition;

the initiator is selected from at least one of

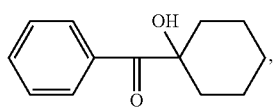

-continued

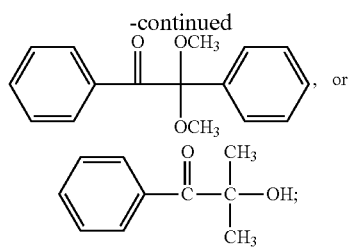

and
the initiator is present in an amount of 0.001-0.05% based on the total weight of the composition.

7. The composition of claim 1, wherein a difference between a maximum temperature and a minimum temperature over which the liquid crystal composition is maintained in a nematic phase is not less than 80 temperature units;
the liquid crystal composition has a rotational viscosity not higher than 250 mPa·s;
a dielectric anisotropy $\Delta\epsilon$ at 25° C. and 1 kHz is −0.5 to −7.5; and
a birefringence $\Delta n$ lower than 0.15.

8. A method for preparing the composition of claim 1, comprising the step of uniformly mixing each of the components of the composition according to claim 1 to obtain the composition.

9. An electro-optical display with active matrix addressing, having the composition of claim 1 as an electrolyte.

10. The electro-optical display of claim 9, wherein the display is a VA, MVA, PVA, PSVA, PSA-VA, PS-IPS or PSA-IPS type display.

11. The composition of claim 1, wherein the weight ratio of the compounds of Formulas I, II, III and IV is 10-40:1-40:0.1-2:10-60.

12. The composition of claim 1, wherein the weight ratio of the compounds of Formulas I, II, III and IV is 2-20:2-20:0.1-1:10-60.

13. The composition of claim 1, wherein the liquid crystal composition consists of 1 to 4 compounds of Formula I, 1 to 5 compounds of Formula II, 1-2 compounds of Formula III and 1 to 5 compounds of Formula IV.

14. The composition of claim 6, wherein the compound of Formula V is present in an amount of 1-20% based on the total weight of the composition.

15. The composition of claim 6, wherein the compound of Formula VI is present in an amount of 0.01-0.05% based on the total weight of the composition.

16. The composition of claim 7, wherein the difference between the maximum temperature and the minimum temperature over which the liquid crystal composition is maintained in the nematic phase is not less than 100 temperature units.

17. The composition of claim 7, wherein the dielectric anisotropy $\Delta\epsilon$ at 25° C. and 1 kHz is −2.0 to −5.5.

18. The composition of claim 7, wherein the birefringence $\Delta n$ is 0.05-0.13.

19. The composition of claim 7, wherein the birefringence $\Delta n$ is 0.08-0.11.

* * * * *